United States Patent [19]

Endo et al.

[11] Patent Number: 4,719,512
[45] Date of Patent: Jan. 12, 1988

[54] NOISE CANCELLING IMAGE SENSOR

[75] Inventors: Yukio Endo; Nozomu Harada, both of Yokohama, Japan

[73] Assignee: Kabushiki Kaisha Toshiba, Kawasaki, Japan

[21] Appl. No.: 872,409

[22] Filed: Jun. 10, 1986

Related U.S. Application Data

[63] Continuation-in-part of Ser. No. 661,683, Oct. 17, 1984.

[30] Foreign Application Priority Data

Oct. 18, 1983 [JP] Japan ................................ 58-195080
Nov. 11, 1985 [JP] Japan ................................ 60-252193

[51] Int. Cl.⁴ .............................................. H04N 3/14
[52] U.S. Cl. .............................. 358/213.18; 358/213.26
[58] Field of Search ............................ 358/213, 167; 357/24 CR, 57

[56] References Cited

U.S. PATENT DOCUMENTS

| | | | |
|---|---|---|---|
| 4,335,406 | 6/1982 | Ohba et al. | 358/213 |
| 4,413,284 | 11/1983 | Izumita et al. | 358/167 |
| 4,499,497 | 2/1985 | Levine | 358/213 |
| 4,549,215 | 10/1985 | Levine | 358/213 |
| 4,556,851 | 12/1985 | Levine | 358/213 |
| 4,562,475 | 12/1985 | Levine | 358/213 |
| 4,567,525 | 1/1986 | Endo et al. | 358/213 |
| 4,608,608 | 8/1986 | Nishizawa et al. | 358/213 |

Primary Examiner—Gene Z. Rubinson
Assistant Examiner—Stephen Brinich
Attorney, Agent, or Firm—Oblon, Fisher, Spivak, McClelland, & Maier

[57] ABSTRACT

A solid-state image sensor has an electrically floating carrier detecting electrode formed on a substrate, into which the signal carriers are transmitted, a sense amplifier circuit detecting the variation in a voltage of the electrode at the time of transferring the carriers, and a resetting electrode for resetting the potential of the electrode to a predetermined potential at every read-out period of the picture element section. A circuit arrangement for removing noise is provided with two switches which alternately become conductive in response to control pulse signals. The first switch becomes conductive during a first period within one picture element period. During the first period the CCD output signal contains an effective image signal component. The second switch becomes conductive during a second period during which the CCD output signal contains a reset noise component, thereby forcibly fixing the level of the reset noise signal to a DC reference potential so that reset noise can be removed.

7 Claims, 57 Drawing Figures

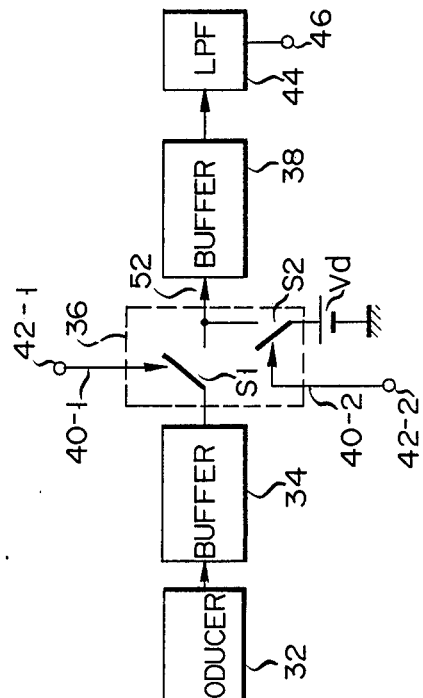
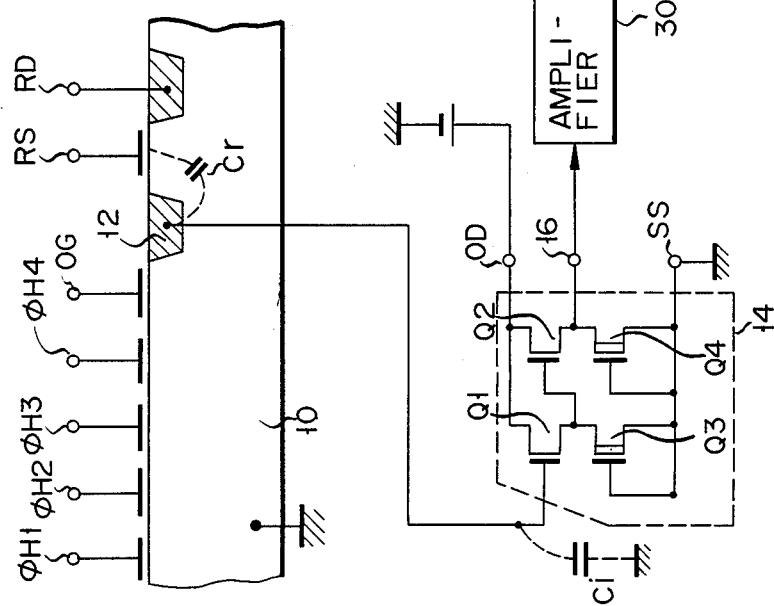
FIG. 1

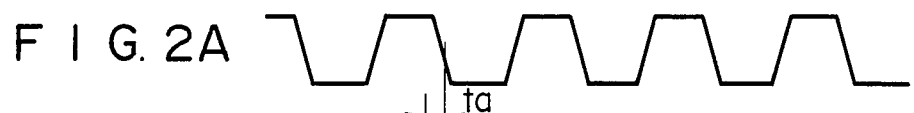
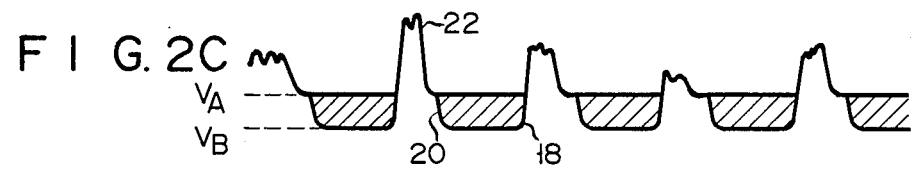
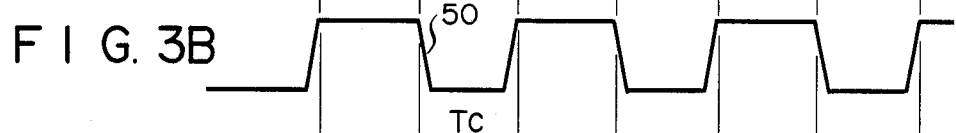
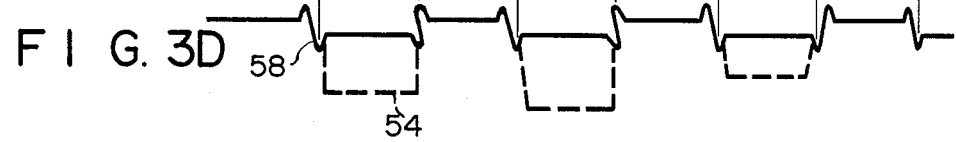
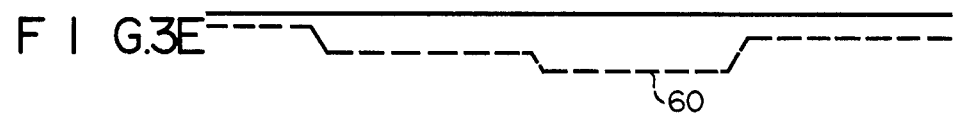

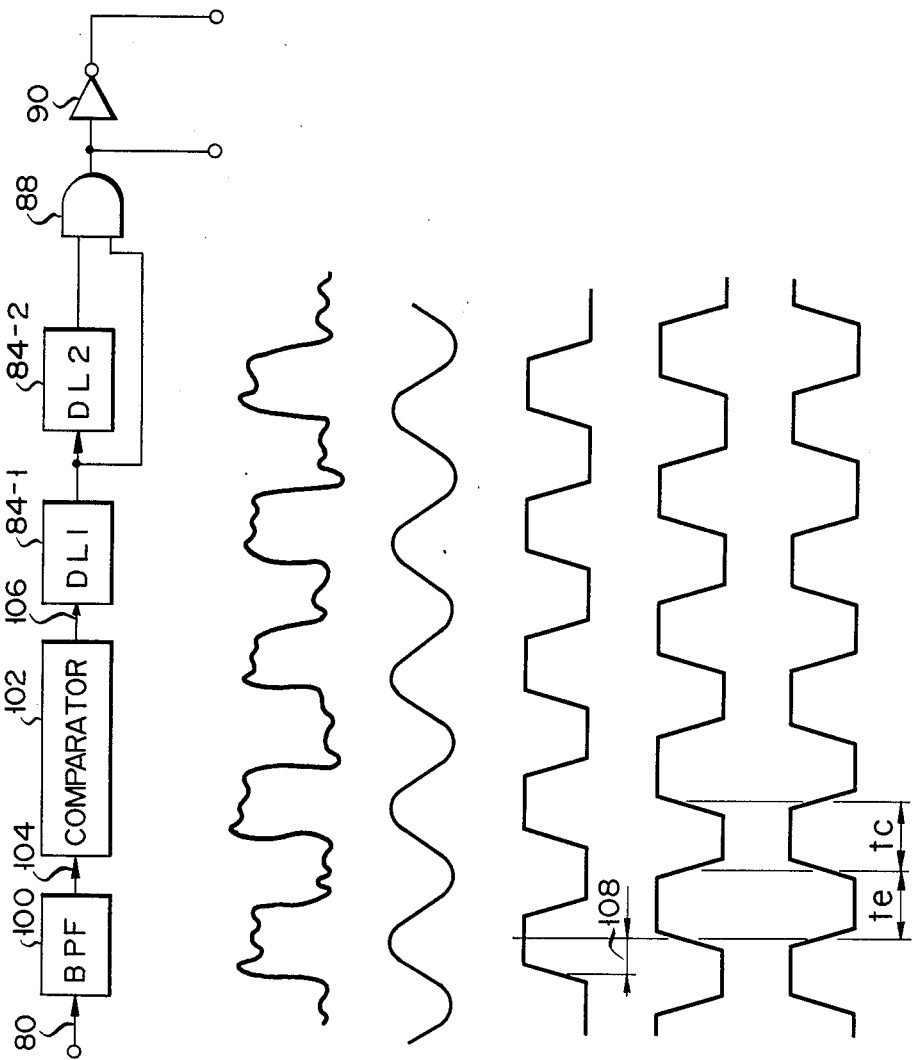

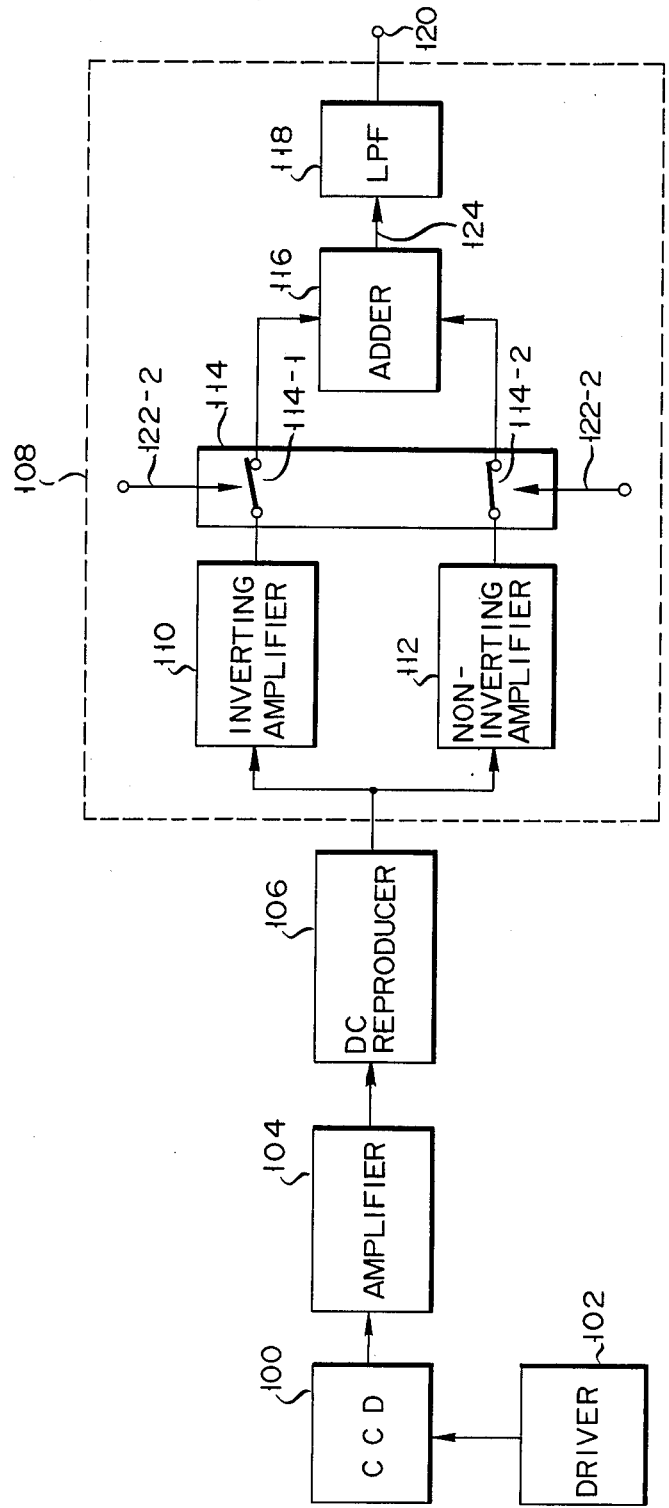

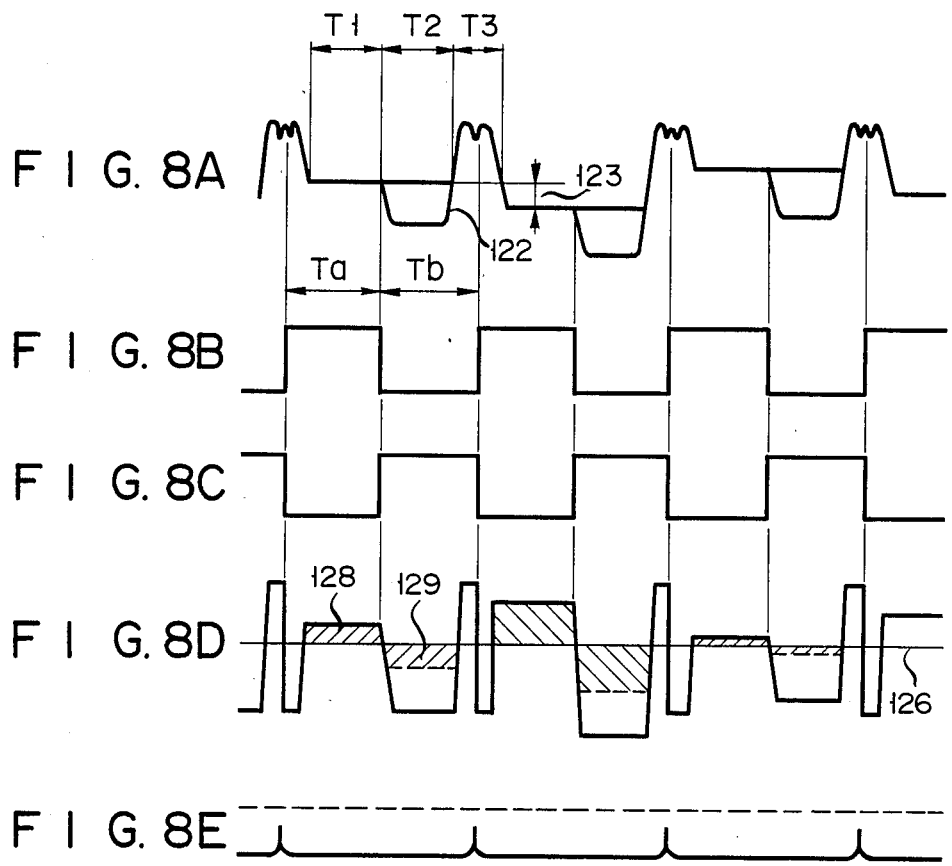

NOISE CANCELLING IMAGE SENSOR

CROSS-REFERENCE TO RELATED APPLICATION

This application is a continuation-in-part of U.S. patent application Ser. No. 661,683 filed on Oct. 17, 1984.

BACKGROUND OF THE INVENTION

The present invention relates in general to a solid-state image sensor, and more particularly, to a highly sensitive solid-state image sensor which is applied to a television camera system.

A solid-state image sensor such as a charge-coupled device (CCD) is small, light-weight and highly reliable as compared with a conventional image-sensing tube. Further, the solid-state image sensor also has an advantage in its extremely small production of image distortion or after-image. The solid-state image sensor can be applied widely in an industrial television camera, a home-use video camera or an electronic still camera due to such an advantage.

The desire for improving the sensitivity of this solid-state image sensor is endless. Further enhancement in the sensitivity of the solid-state image sensor will be increasingly desired in the future. The increasing sensitivity may be performed in general by enhancing the efficiency of the photoelectric conversion of the sensor itself and of the signal-to-noise ratio (SN ratio) of the sensing image by decreasing the noise components generated from the sensor itself. Particularly, the generation of noise components by the sensor itself is a main factor in determining the image sensitivity of the CCD. In other words, the suppression of the generation of noise in the sensor itself is the most effective means for improving the sensitivity of the sensor.

Various efforts have heretofore been directed to a technique for suppressing the generation of the noise in a solid-state image sensor to improve its sensitivity. However, it is still difficult to uniformly and preferably suppress or prevent noise from being generated over a wide frequency band.

For example, the conventional image-sensing system includes a signal output circuit for a charge-coupled device (CCD) well-known by those skilled in the art as a "floating diffusion type output circuit". According to the conventional image-sensing system, signal carriers photoelectrically converted by the CCD are sequentially transferred in the surface area of a substrate under the transfer electrodes of the CCD, and then flow to an electrically floating diffusion layer through an output gate electrode. The variation in the voltage of this layer is detected by a sense amplifier, and is output from the output terminal of the CCD. In the meantime, a pulse signal having a predetermined fixed period is applied to a reset gate electrode, and the voltage of the diffusion layer is reset to a reference voltage.

Noise components are generated during when the reset gate electrode is ON. Since the generation of this type of noise is caused by thermal noise in the MOS-FETs, the noise is indispensable and cannot be prevented in advance. (The thermal noise is created by the fact that a current flows to the MOSFET formed of the reset gate electrode, reset drain electrode and n-diffusion layer.) Further, part of the reset pulse signal is mixed with a sense amplifier line through a capacitance between the reset gate electrode and the n-diffusion layer during the ON period of the reset gate electrode. If the amplitude of such a mixed pulse is varied, noise arises. Noise generated by such a mechanism in a signal output section is generally called "reset noise". When the output signal level from the solid-state image sensor is averaged by a known low-pass filter to increase the effective signal period, the above-described reset noise is mixed in the pure image signal (effective image signal) as low frequency components. As a result, the level of the output image signal is varied, and the SN ratio of the image signal thus obtained is decreased, thereby largely degrading the sensitivity of the CCD. Since the reset noise has low frequency components, this noise generates a very rough noise image on the reproduced image, thereby remarkably deteriorating the quality of the reproduced image.

The so-called "correlated double sampling processor" for improving the S/N ratio of the image signal by removing the reset noise of this type is well-known by those skilled in the art. According to this technique, a reference voltage in the stable period of the output signal of the CCD is forcibly clamped to a predetermined voltage, and the signal voltage during the effective signal period is then sampled. Further, an improved method for performing correlated double sampling after increasing the period by sampling the stable period once is proposed in Japanese Patent Disclosure (KOKAI) No. 55-163693.

However, according to the above-described prior technique, in a high speed image-sensing system in which the frequency of a clock pulse signal for driving a solid-state image sensor is set to several megahertz or higher, its stable period becomes short, and no margin exists in the clamping time, with the result that there arises no expectation in the improvements in the SN ratio. More concretely, a CCD which was designed and produced as a test model by the inventors and which has 400 horizontal picture elements and 500 vertical picture elements, had a horizontal clock frequency of 7.16 MHz. In this case, one period of the signal becomes 140 nsec. In order to operate reliably in this period, the pulse of the reset gate electrode RS is on approximately 35 nsec., the stable period becomes approximately 35 nsec., and the effective signal period becomes approximately 70 nsec. Though the stable period is 35 nsec., the period in which the reference voltage VA becomes sufficiently stable is actually approximately 15 nsec. Therefore, it is necessary to clamp within the 15 nsec., which is very difficult to do. In addition, since a narrow pulse having a pulse width of 15 nsec. or shorter is necessary, this pulse is mixed in the signal, and the SN ratio is deteriorated. Further, the correlated double sampling processor does not accurately operate if a high frequency noise is contained during the stable period of the output signal of the CCD, and the SN ratio is rather deteriorated from the previous state before clamping. If the clamped pulse contains pulse components in the signal band, the components are mixed as fixed noise with the output signal, and the reproduced image is remarkably deteriorated.

As described above, because the noise of the output circuit of the conventional CCD operates using at least several megahertz of the clock frequency, it has not heretofore been able to be removed; the SN ratio of the CCD is deteriorated; and a television of high sensitivity cannot be produced.

SUMMARY OF THE INVENTION

It is therefore an object of the present invention to provide a solid-state image sensor with high sensitivity capable of suppressing the noise generation in the sensor itself to the minimum level, thereby enhancing the signal-to-noise ratio.

An image-sensing apparatus according to the present invention includes a solid-state image sensor receiving incident image light to generate an electrical CCD output signal. The image sensor has a photosensing picture element section, formed on a substrate, for photoelectrically converting the image light to produce signal carriers. An electrically floating carrier detecting section is formed on the substrate for receiving the signal carriers transmitted thereinto. A sense amplifier circuit unit detects the variation in a voltage due to the transfer of the signal carriers into the carrier detecting section, thereby outputting a detection signal. A resetting section is formed on the substrate for resetting the potential of the above carrier detecting section to a predetermined potential at every read-out period of the photosensing picture element section. A noise eliminating device is additionally connected to the image sensor. The noise eliminating device divides one picture element period of the CCD output signal into a first period during which an effective image signal component is generated and a second period during which a reset noise component generated in said resetting section is mixed with the CCD output signal, thereby forcibly fixed a level of the CCD output signal to a predetermined reference potential level during said second period to remove the reset noise from the CCD output signal.

Further, to achieve the same object, the present invention provides another type of noise-removing device, which is connected to the image sensor. This noise-removing device divides one picture element period of the CCD output signal into a first period during which the CCD output signal consists of a noise component generated in the image sensor itself, and a second period during which the CCD output signal consists of a mixture of a noise component and an effective image signal component. This second period is so set as to be longer than the first period. The noise-removing device amplifies the CCD output signal at first and second amplification gains which are determined to be different from each other during the first and second periods in such a manner that the first gain is large enough to cause an integration value of the noise component appearing in the first period is substantially equal to that in the first period. The noise-removing device inverts the differently amplified CCD output signal only during one of the first and second periods and then adds the signal waveforms of the CCD output signal during the first and second periods to each other, to thereby cancel out the noise components appearing in the first and second periods.

BRIEF DESCRIPTION OF THE DRAWINGS

The present invention is best understood by reference to the accompanying drawings, in which:

FIG. 1 is a block diagram showing the overall configuration of an image-sensing system in accordance with a first embodiment of the present invention;

FIGS. 2A to 2C and FIGS. 3A to 3E are diagrams showing the waveforms of signals generated in an essential section of the image-sensing system of FIG. 1;

FIG. 5 is a circuit diagram showing a modified example of the circuit arrangement of FIG. 4;

FIGS. 6A to 6E are diagrams showing the waveform of signals generated in an essential section of the image-sensing system of FIG. 5;

FIG. 7 is a block diagram showing the overall configuration of an image-sensing system according to a second embodiment of the present invention;

FIGS. 8A to 8E are diagrams showing the waveforms of signals generated in an essential section of the image-sensing system of FIG. 7;

DETAILED DESCRIPTION OF THE PREFERRED EMBODIMENTS

Figure 4:
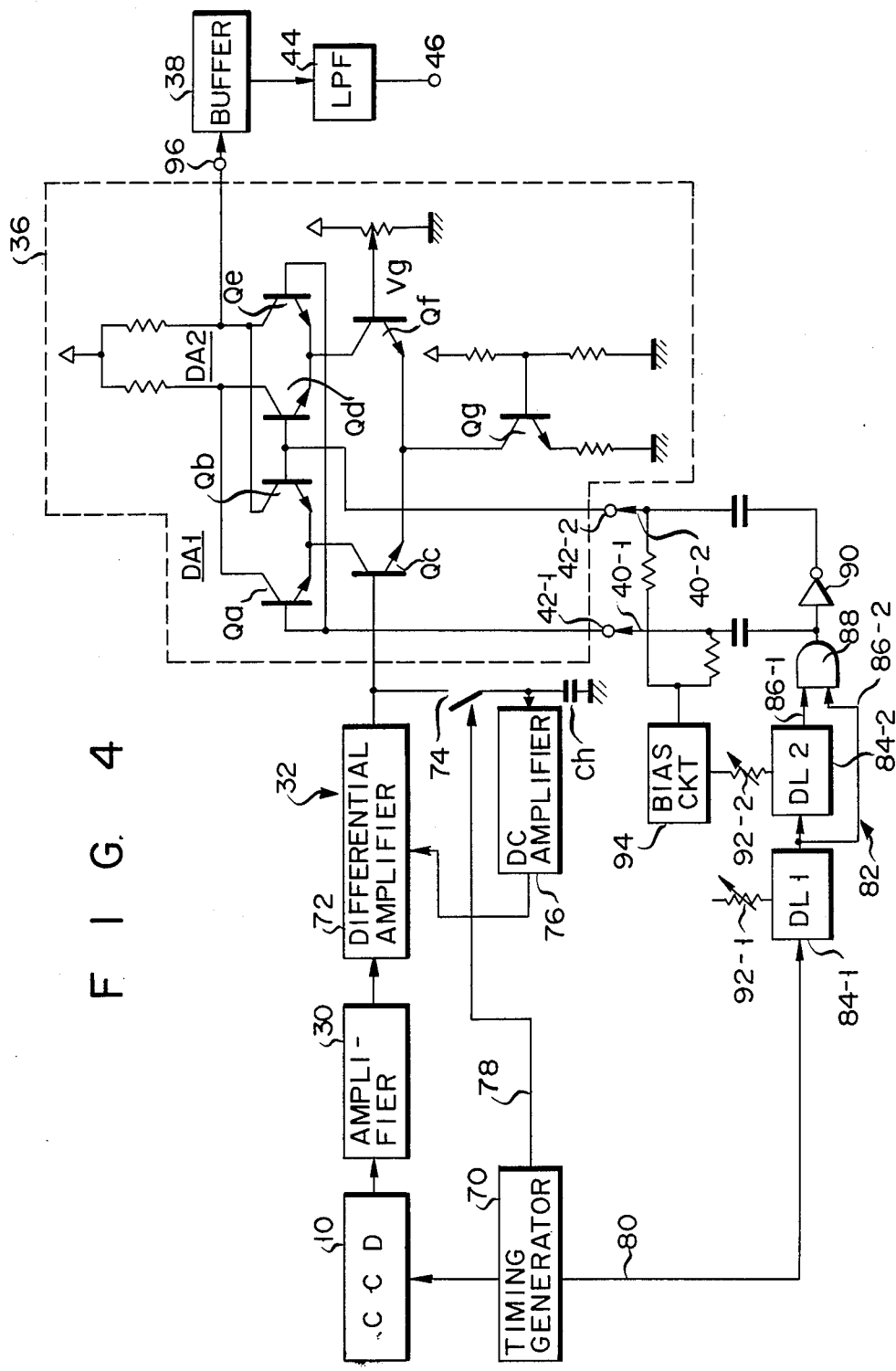
FIG. 4 is a circuit diagram for illustrating in more detail the circuit arrangement for removing the noise contained in the image-sensing system of FIG. 1.

Referring now to FIG. 1, an overall configuration of an image-sensing system applied to a television camera according to a first embodiment of the present invention is shown. In FIG. 1, the configuration of a signal output circuit section of only a solid-state image sensor, i.e., a charge-coupled device (CCD), is schematically shown.

Transfer electrodes $\phi H1$, $\phi H2$, $\phi H3$, $\phi H4$, output gate electrode OG, reset gate electrode RS, and reset drain electrode RD are provided on a semiconductor substrate 10 of a p-conductivity type, for example. Pulses or current voltage signals are applied to the electrodes $\phi H1$ to $\phi H4$, OG, RS and RD, so that photoelectrically converted signal charges or signal carriers are transferred in the right direction of the drawing. An n-type semiconductive diffusion layer 12 provided between the output gate electrode OG and the reset gate electrode RS which is electrically floating, constitutes a signal carrier-detecting diode together with a substrate 10. A sense amplifier circuit 14 is connected to the n-type diffusion layer 12. The sense amplifier circuit 14 is an emitter-follower circuit consisting of E-type MOSFETs Q1, Q2; and D-type MOSFETs Q3, Q4. In the circuit 14, there are provided common drain electrodes of the MOSFETs Q1, Q2; a substrate electrode SS; and a signal output terminal 4. The photoelectrically converted signal carriers are sequentially transferred on the surface area of the substrate under the electrodes $\phi H1$, $\phi H2$, $\phi H3$, $\phi H4$, and flow to the electrically floating diffusion layer 12 through the output gate electrode OG. The variation in the potential of the layer 12 is detected by the sense amplifier 14, and is output from an output terminal 16. In the meantime, a pulse signal having a predetermined fixed period is applied to the reset gate electrode RS to reset the potential of the diffusion layer 12 to a reference voltage. The output circuit unit thus constructed as described above is well-known by those skilled in the art as a floating diffusion type output circuit.

The waveform of the pulse applied to the transfer electrode $\phi H4$ is shown in FIG. 2A. The waveform of the reset pulse applied to the reset gate electrode RS is shown in FIG. 2B. When the pulse signal of FIG. 2B is high, the potential of the n-diffusion layer 12 is raised to the potential of the reset drain RD. Then, "ta" in the drawing defines the time period that the reset gate electrode RS is OFF while the transfer electrode $\phi H4$ of the final stage becomes ON. In this time period ta, the potential of the n-diffusion layer 12 is equal to constant reference voltage VA. The reference voltage VA is determined on the basis of the divided voltage by the total gate capacitance Ci between the n-diffusion layer 12 and the sense amplifier 3, and the capacitance Cr between the reset gate electrode RS and the n-diffusion layer 12.

When the pulse signal (FIG. 2B) applied to the reset gate electrode RS becomes low and the pulse signal (FIG. 2A) applied to the transfer electrode $\phi H4$ of the final stage simultaneously becomes low, the signal carriers flow to the n-diffusion layer 12, with the result that the potential of the layer 12 varies with reference voltage VB. The period that the potential of the n-diffusion layer 12 becomes the reference voltage VB is the effective signal period, and is shown by the hatched section 18 for the convenience of illustration. Incidentally, reference numeral 20 designates a stable period.

Noise components having the waveform shown by "22" in FIG. 2C are generated when the reset gate electrode RS is on. Since the generation of this type of noise is caused by the thermal noise of the MOSFETs, the noise cannot be prevented. (Thermal noise is created by the current that flows to the MOSFET formed of the reset gate electrode RS, reset drain electrode RD and n-diffusion layer 12.) Further, part of the reset pulse signal is mixed with the sense amplifier line through the capacitance Cr between the reset gate electrode RS and the n-diffusion layer 12 during the ON period of the reset gate electrode RS. When the amplitude of such a mixed pulse varies, noise is created. Noise generated in the signal output section by such a mechanism is in general called "reset noise". When the level of the output signal from the solid-state image sensor is averaged by the known low-pass filter (not shown) to increase the effective signal period 18, the above-described reset noise is mixed in the effective image signal as low frequency components. As a result, the level of the output image signal varies, the signal-to-noise ratio (SN ratio) of the image signal thus obtained is decreased, and the sensitivity of the CCD is largely degraded. Since the reset noise has low frequency components, the noise creates a very rough noise image on the reproduced image, thereby significantly deteriorating the quality of the reproduced image.

Returning to FIG. 1, the output signal from the sense amplifier 14 is supplied to an amplifier 30. The amplifier 30 amplifies the voltage of the output signal to a predetermined level. The amplifier 30 has frequency characteristics of the degree for transmitting the rectangular waveform components of the output signal. The signal amplified to the signal voltage of a predetermined level by the amplifier 30 is supplied to a DC reproducer 32. The DC reproducer 32 clamps the input signal to itself in a horizontal scanning period to remove hum noise which is slower than the horizontal scanning period. The output signal from the DC reproducer 32 is supplied to an image signal extracting circuit 36 through a buffer circuit 34. The extracting circuit 36 extracts the effective signal period and the reset noise period of the output signal of the CCD, and forcibly fixes the output signal level of the CCD to a predetermined DC voltage, thereby serving to extract pure image signal components having no reset noise. The extracting circuit 36 is fundamentally composed of two switch units S1, S2. The first switch unit S1 is connected in series between the buffer circuit 34 and a buffer circuit 38 of the rea stage. The first switch unit S1 switches in response to a control pulse signal 40-1 supplied from the first control terminal 42-1 of the circuit 36. When the first switch unit S1 is conductive, the output signal from the buffer circuit 34 is transmitted to a signal output terminal 46 through the buffer circuit 38 of the rear stage and a low-pass filter circuit 44. The second switch unit S2 is connected between the output end of the first switch unit S1 and the ground. A predetermined DC voltage is applied by a DC voltage source Vd to the input of the second switch unit S2. The second switch unit S2 performs a switching operation in response to the control pulse signal 40-2 supplied from the second control terminal 42-2 of the circuit 36. The first and second switch units S1, S2 perform the switching operation to alternatively become conductive. When the first switch unit S1 is nonconductive and the second switch unit S2 is conductive, the input signal level to the buffer circuit 38 is set to the DC voltage Vd.

The control pulse signals 40 supplied to the first and second switch units S1, S2 have the same period as the horizontal clock pulse of the CCD. The phase relationship of the waveforms of the control pulse signals 40 is very important. One period of the output signal of the CCD consists, as shown in FIG. 3A, of a reset noise generating period Tn, a stable period Ts and an effective image signal period Te. The control pulse signal 40-1 has, as shown in FIG. 3B, pulse components which become high in synchronization with the effective signal period Te. The control pulse signal 40-2 has, as shown in FIG. 3C, the reverse phase of the waveform of the pulse signal 40-1, and has a signal waveform that becomes low in synchronization with the effective image signal (or pure image signal) period Te. Therefore, the first and second switch units S1, S2 are controlled so that the first switch unit S1 becomes nonconductive during the reset noise generation period Tn while the second switch unit S1 becomes conductive. As a result, the waveform of the signal 52 (which is input to the buffer 38) obtained through the circuit 36 has, as shown in FIG. 3D, a CCD effective image signal 54 in the effective signal period Te of the CCD output signal, and becomes the waveform forcibly fixed to the DC voltage Vd in the period Tc combined with the reset noise generation period Tn and the stable period Ts. As apparent from FIG. 3D, the signal 52 is free from the reset noise 56 shown in FIG. 3A. In other words, the CCD output signal transmitted through the buffer 34 is extracted by the operation of the circuit 36 only during the effective signal period Te, and is prevented from transmitting to the buffer 38 of the rear stage during the other period Tc.

It should be noted, in FIG. 3D, that reference numeral 58 represents spike noise that is mixed from the control pulse signals 40. The frequency band of the spike noise 58 is sufficiently displaced from that of the CCD effective image signal, and does not affect the signal-to-noise ratio of the reproduced image. The spike noise 58 can be effectively removed when the effective signal is averaged in the low-pass filter 44. The CCD effective image signal is averaged by the low-pass filter 44 as shown by broken line 60 in FIG. 3E.

Therefore, according to the present invention, the CCD output signal which indispensably contains the reset noise is transmitted to the rear stage after being extracted by only the circuit 36 during the effectivs signal period Te. The reset noise included in the CCD output signal is reliably inhibited to be transmitted by the circuit 36. Thus, the image signal obtained finally becomes a preferable signal which includes almost no noise components and has a high SN ratio. Consequently, it contributes greatly to the performance of a CCD image-sensing system having high sensitivity.

Referring to FIG. 4, an internal circuit configuration of the effective image signal extracting circuit 36 is shown in detail. This concrete arrangement was actually designed and produced by the present inventors. As a result of the experiments by the present inventors, it is confirmed that the reset noise could be effectively removed from the CCD output signal by employing the circuit 36 shown in FIG. 4.

The effective signal extracting circuit 36 is constituted by utilizing a concept of what is called the "double equilibrium differential circuit". When the double equilibrium differential circuit, combined with two sets of differential amplifier circuits, is used as the effective image signal extracting circuit 36 of the present invention, the frequencies of the control pulse signals 40-1, 40-2 are improved and accelerate the extraction (reset noise-removing process) of the effective signal or pure image signal. Further, in this case, the above-described spike noise generated due to the mixture of the CCD image signal with the control pulse signals 40 can be reduced.

The CCD image sensor 10 is connected to a timing generator 70, and is driven by the timing generator 70. The image-sensing signal from the CCD image sensor 10 is supplied to a DC reproducer 32 through the amplifier 30. In FIG. 4, the DC reproducer 32 is constituted of a feedback clamp circuit having a differential circuit 72, a sample-hold circuit 74, a hold capacitance Ch, and a DC amplifier 76. The timing generator 70 supplies the sample-hold circuit 74 with a clamp pulse siqnal 78. The sample-hold circuit 74 holds the capacitance Ch at the level of a predetermined time point of the horizontal blanking period of an input signal to the circuit 36 in synchronization with the clamping pulse signal 78. The signal voltage held by the capacitance Ch is converted to the voltage of the horizontal period, amplified by a DC amplifier 76, and then supplied to the input of the differential circuit 72. Thus, a reliable DC reproduction can be performed.

A pulse signal 80 having the same period as that of the CCD horizontal clock pulse obtained by the timing generator 70 is supplied to a control pulse generating circuit 82. This control pulse generator 82 is constituted of delay circuits 84-1, 84-2. Two pulse signals 86-1, 86-2 having phases delayed by a predetermined time are obtained by these two delay circuits 84-1, 84-2. The pulse signals 86 are supplied to an AND gate 88 to produce the pulse signals having the waveforms shown in FIGS. 3B and 3C, respectively. More specifically, the pulse signal output directly from the AND gate 88 corresponds to the above-described control pulse signal 40-1, while the pulse signal inverted by an inverter 90 from the output signal from the AND gate 88 corresponds to the above-described control pulse signal 40-2. According to the present invention, the phase of the control pulse signals 40 must be controlled to synchronize with the CCD output signal, but this operation can be readily and effectively performed by phase control resistors 92-1, 92-2, respectively, provided in the delay circuit 84.

The effective signal extracting circuit 36 includes: (1) a first differential amplifier unit DA1 which has transistors Qa, Qb (serving as differential drivers) and Qc (serving as a constant current circuit); and (2) a second differential amplifier unit DA2 which has transistors Qd, Qe (serving as differential drivers) and Qf (serving as a constant current circuit). Such a circuit arrangement itself is well-known and is called the double equilibrium differential amplifier circuit. In this circuit 36, the bases of the transistors Qa and Qe are commonly connected to each other, while the bases of the transistors Qb and Qd are commonly connected to each other. The collectors of the transistors Qa and Qd are commonly connected to each other, while those of the transistors Qb and Qe are commonly connected to each other. Further, the emitter of a constant-current circuit having the transistors Qc and Qf is connected to a constant-current circuit having a transistor Qg.

The operation mode (reset noise-removing operation) of the circuit arrangement shown in FIG. 4 will now be described in detail hereinafter. The signal reproduced from the DC is supplied to the base of the transistor Qc. The DC voltage Vg of the fixed voltage level is supplied to the base of the transistor Qf. The first control pulse signal 42-1, which is added with a predetermined bias voltage by a bias circuit 94, is supplied to the bases of the transistors Qa and Qe. The second control pulse signal 42-2 having a reverse phase to the first control pulse signal 42-1 is supplied to the bases of the transistors Qb and Qd. As a result, when pulses of positive polarity are input to the bases of the transistors of the differential pair, the collector currents of the differential pair are saturated. When, however, pulses of negative polarity are input to the bases of the transistors of the differential pair, the differential pair is cut off. Accordingly, the collector currents of the differential pair flow in an ON/OFF repetitive pulse manner in every half period of the control pulse signal 40-1. Thus, only the effective image signal components are extracted from the CCD image signal in the output terminal 96 of the circuit 36, and a voltage signal which is forcibly fixed to the predetermined DC voltage Vg is obtained during the reset noise period Tn and the stable period Ts (i.e., the periods Tc, Tc=Tn+Ts). This signal appears as the final image-sensing signal, containing no reset noise at the terminal 46 through the buffer 38 and the low-pass filter 44.

According to the above-described circuit arrangement for removing or eliminating reset noises contained in an CCD image signal from the CCD 10, since the double equilibrium differential circuit of a high speed type is utilized, the extracting operation of the effective image components (i.e., the reset noise removing operation) has been effectively performed. Further, since the control pulse signals 40-1, 40-2, cancel each other in the differential circuit, the dynamic range of the entire circuit can be enhanced, and matching with the signal processor (not shown) provided at the rear stage can be facilitated. In an example actually produced by the present inventors, the CCD 10 which employed a CCD chip having 400 (horizontal direction)×500 (vertical direction) picture elements was used. Up until this time, reset noise mixed with a CCD image-sensing signal could not be reduced to 2 mV or lower. However, according to this example, the reset noise could be greatly reduced to 0.2 mV, approximately one-tenth that of the conventional value. This fact means that the conventional television camera having 3,200° K. of brightness, F1.4 of lens diaphragming and 10 lux of sensitivity can perform with a sensitivity of 1 lux, corresponding to the sensitivity of approximately ten times that under the same conditions. In other words, merely by adding the circuit arrangement of the present invention, the practical characteristic range of the CCD can be increased approximately ten times.

In the above-described embodiment, a circuit arrangement for preventing noises from mixing with the control pulse signals 42 themselves as shown in FIG. 5 may also be adopted.

The essential subject of the present invention is to extract the effective image signal period Te of the CCD output signal and the reset noise generation period Tn, and to forcibly fix the CCD output signal to a predetermined DC voltage level during the reset noise generation period, thereby improving the signal-to-noise ratio of the image signal by removing the reset noise. However, the mixture of noises of a different type than those in the control pulse signals 42 input to the circuit 36 cannot be completely avoided. (In this case, it, naturally, causes a decrease in the signal-to-noise ratio of the image signal.) The synchronous pulses generated in the timing generator 70 of FIG. 4 are considered as noises of this type.

According to FIG. 5, a series circuit of a bandpass filter 100 and a comparator 102 is added between the timing generator 70 and the delay circuit 84-1 of FIG. 4. A reference pulse (see FIG. 6A) obtained by the timing generator 70 is first passed through the band-pass filter 100 to produce a sinusoidal wave signal 104 having the same frequency as the horizontal clock frequency as shown in FIG. 6B. The frequency components, except for the horizontal clock frequency are attenuated by such a signal processing. Therefore, the sinusoidal wave signal from which noises are removed can be obtained. This sinusoidal wave signal 104 is supplied to the comparator 102. The comparator 102 produces a signal 106 having the rectangular waveform as shown in FIG. 6C, which signal is transmitted to the aforementioned delay circuits 84. These delay circuits 84 control the waveform phase of the output signal 106 from the comparator 102 to produce a control pulse signal 42-1 matching the extracting position of the CCD output signal. The signal 42-1 is inverted by an inverter 90 (FIG. 4) to produce the control pulse signal 42-1. (In FIG. 6, reference numeral 108 represents phase control displaced components.) As a result, even if the noises ar mixed with the reference pulse from the timing generator 70, these noises can be effectively removed to produce a control pulse signal 42 of high quality. Consequently, when such control pulse signals are supplied to the circuit 36, the reproduced image signal which is further improved in the signal-to-noise ratio can be produced.

The noises ordinarily generated in the solid-state image sensor contain, in addition to the aforementioned reset noises, noises known by those skilled in the art as "1/f noise". This kind of noise is generated in the emitter-follower type sense amplifier 14. Therefore, in order to perfectly perform the above-described object of the present invention, it is also important to remove this 1/f noise. The more the frequency of the image-sensing signal decreases, the more the noise of this type increases, thereby deteriorating the quality of the reproduced image. The second embodiment of the present invention as presented in the following includes a circuit arrangement for removing this 1/f noise. In general, a noise generation period, and a noise and signal mixture period are set within one picture element period of the CCD output signal. The voltage signal during one period is supplied to an inverting amplifier, and the voltage signal is supplied to a synchronizing amplifier during the other period. The output signals from these two amplifiers are inverted by the two switch units and an adder circuit only during the noise is generated. The signal thus obtained is averaged to cancel the waveforms of the noise components.

FIG. 7 schematically shows the entire circuit configuration of an image-sensing system according to a second embodiment of the present invention. A solid-state CCD image sensor 100 is driven by a predetermined pulse signal from a driver circuit 102. The CCD output signal from the CCD image sensor 100 is supplied to a noise-removing circuit unit (or a noise-eliminating circuit unit) through an amplifier 104 and a DC reproducer circuit 106. The DC reproducer circuit 106 clamps the CCD output signal in the horizontal scanning period to serve to remove hum noises having period components longer than the horizontal scanning period from the CCD output signal.

The noise-removing circuit 108 includes an inverting amplifier 110 and a synchronizing amplifier 112. The output signal from the DC reproducer 106 is supplied to the inverting amplifier 110 and the synchronizing amplifier 112. A switching circuit 114, which has two switches 114-1 and 114-2, is provided at the rear stage of the amplifiers 110, 112. Accordingly, the outputs of the amplifiers 110 and 112 are connected to an adder circuit 116 through the switches 114-1 and 114-2, respectively. The adder circuit 116 adds the output signals from the switches 114-1 and 114-2, and supplies the addition signal to the low-pass filter (LPF) 118 of the rear stage. The LPF 118 averages the addition signal and outputs from an output terminal 120.

The switches 114-1 and 114-2 respectively respond to the control pulse signals 122a and 122b to alternatively turn on and off so that the electric states thereof become their reverse. The CCD output signal is controlled in the operation by the driver 102 to have, as shown in FIG. 8A, (1) a period (noise period) T1 containing only noise without image-sensing signal components, (2) a period (mixture period) T2 containing the image-sensing signal and the noises, and (3) a period (reset period) T3 for generating the mixture of the reset pulse. (In FIG. 8A, reference numeral 122 represents image-sensing signal components, and "123" represents noise components.) It is important in this case that the noise period T1 and the reset period T3 be equal in length to the period (i.e., T1=T3). The control pulse signals 122a, 122b supplied to the switches 114-1, 114-2 are signals of a rectangular waveform having reverse phases to each other (displaced by 180°) as shown in FIGS. 8B and 8C. It is natural that these control pulse signals 122a, 122b be synchronized with the horizontal read-out period of the CCD 100. The first switch 114-1 serves the switching operation to respond to the control pulse signal 122a to become conductive during the period Ta including the noise period T1, and nonconductive during the other period Tb including the mixture period T2. On the contrary, the second switch 114-2 serves the switching operation to respond to the control pulse signal 122b to become nonconductive during the period Ta and conductive during the other period Tb.

The output signal of the inverting amplifier 110 (i.e., the CCD output signal inverted by the amplifier 110) is input to the switch 114-1, and is supplied to the adder 116 only during the period Ta since the switch 114a becomes conductive during this period. On the other hand, the output signal of the synchronizing amplifier 112 (i.e., the CCD output signal not inverted) is input to the switch 114-2, and supplied to the adder 116 only during the period Tb since the switch 114-2 becomes conductive during this period. The adder 116 adds these output signals to each other to produce an addition result signal 124 having the waveform as shown in FIG. 8D. As apparent from FIG. 8D, the noises during the period T1 are inverted to a reference voltage level 126 and are protruded as shown by numeral "128". (Only for readily understanding is the section of the inverted noise component 128 for improving the signal-to-noise ratio of the image-sensing signal hatched.) The noise component contained in the CCD output signal during the period Tb is obtained in phase as shown by "129" in FIG. 8D. This fact means that the noise repetitive frequency becomes substantially twice that of the image-sensing signal. The waveform, from which the noise shown in FIG. 8E is removed, can be obtained by averaging the signal 124 of FIG. 8D by the LPF 118. It should be mentioned that, since the control pulse signals 122 have reverse phases, the deterioration of the imagesensing signal caused by the mixture of the clamped pulse due to the pulse signals 122 themselves is not produced at all.

Figure 9A:
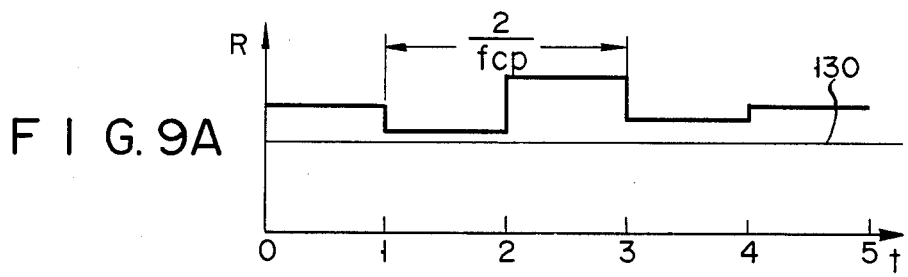
FIGS. 9A and 9B are graphic diagrams used to describe the principle of the operation of a noise-eliminating technique of the second embodiment of the present invention and showing the responding characteristics R of the noise to a time t.
Figure 9B:
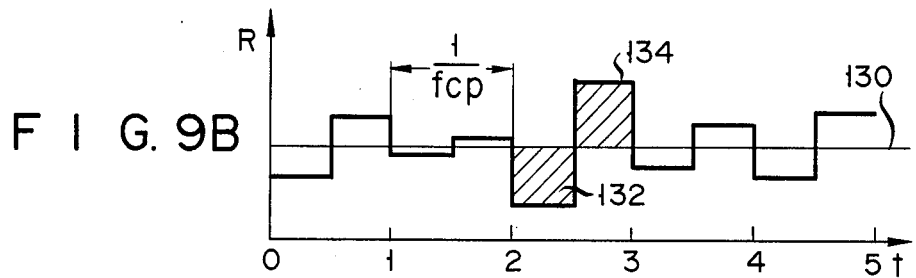

A principle of the operation of the aforementioned second embodiment of the present invention will be described with reference to FIGS. 9 and 10. FIGS. 9A and 9B are graphs showing the noise responding characteristics R to the time t. The graph of FIG. 9A shows the responding characteristics R of the reset noise or the 1/f noise contained in the CCD output signal. (Reference numeral "130" denotes a reference voltage level.) This noise is generated in a period twice that of the CCD read-out clock frequency $f_{CP}$. As shown in FIG. 9B in one period ($1/f_{CP}$) of the CCD read-out clock, in accordance with the concept of the aforementioned embodiment, this noise is divided into an inverted noise 132 and the noise 134 of the same phase. As a result, the noise frequency doubles.

Figure 10A:
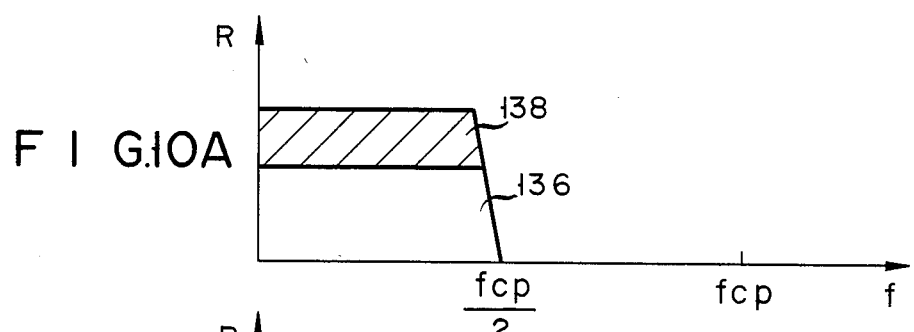
FIGS. 10A and 10B are graphic diagrams respectively showing the frequency characteristics of the CCD output signals obtained by the conventional and the second embodiment of the present invention.
Figure 10B:
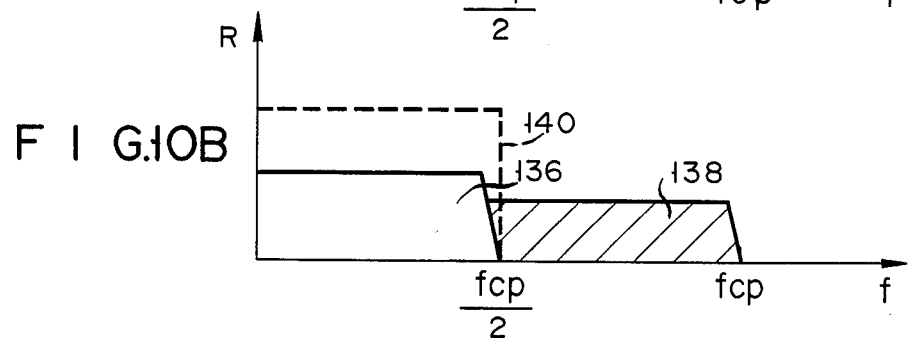

FIGS. 10A and 10B respectively show graphs of the frequency characteristics of the CCD output signal (its abscissa axis represents the frequency f) of the conventional case and the embodiment of the present invention. The CCD output signal waveform of FIG. 10A ordinarily contains image-sensing signal components 136 and noise components 138 in a frequency band lower than one-half of the CCD read-out clock frequency $f_{CP}$. According to the second embodiment, as a result of the doubling of the aforementioned noise frequency, only the noise components 138 are shifted to the frequency band higher than one-half of the CCD read-out clock frequency $f_{CP}$. Therefore, when the LPF 118 having a filtering property to cut off the frequency components higher than the frequency level shown by the broken line 140 in FIG. 10B is employed, only the image-sensing signal components 136 can be extracted. Thus, according to the present second embodiment, the 1/f noise can be reliably removed or eliminated from the CCD output signal to improve the signal-to-noise ratio of the image-sensing signal, thereby largely contributing to the performance of the CCD television camera having high sensitivity.

Figure 11:
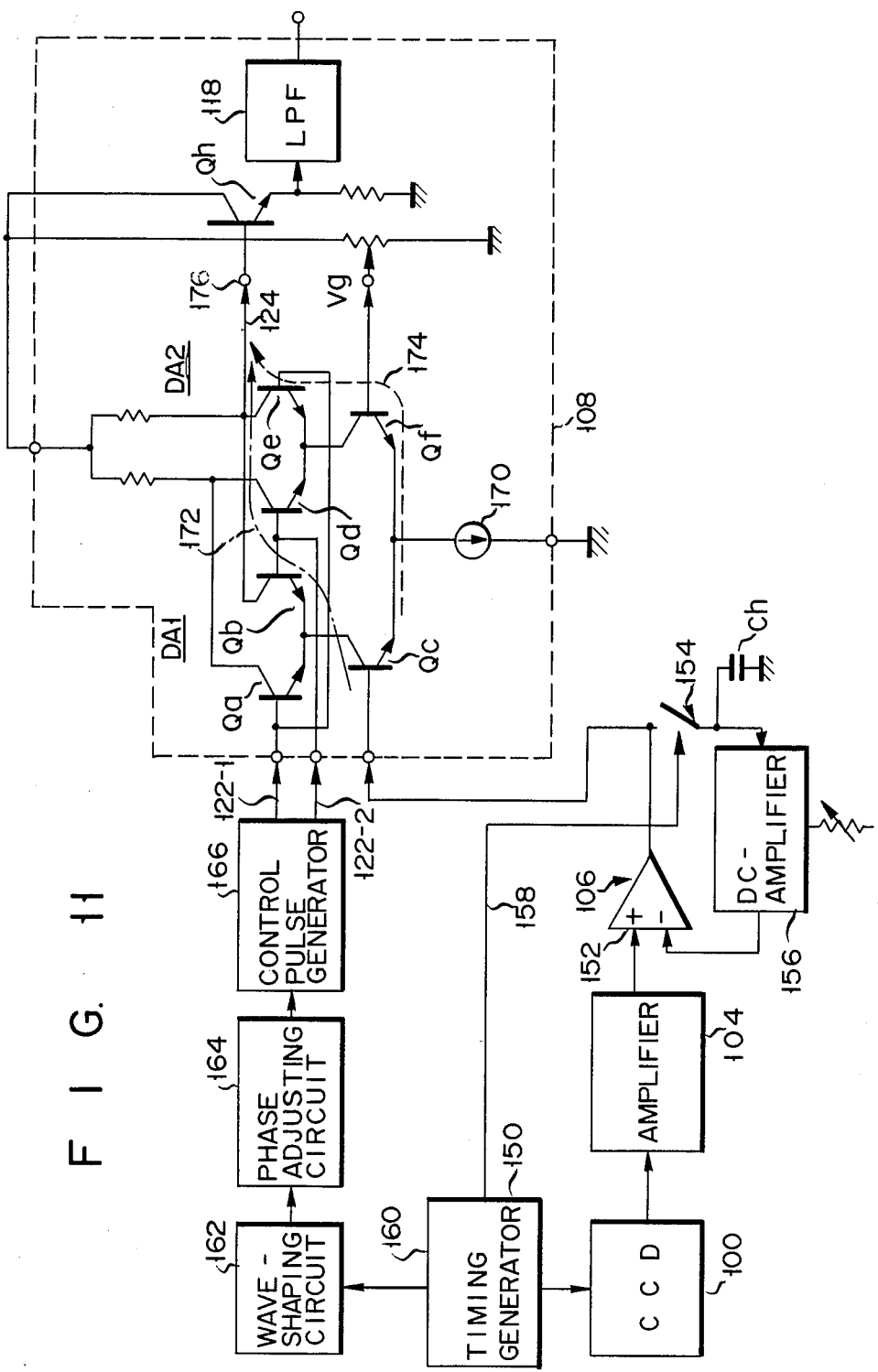
FIG. 11 is a circuit diagram illustrating in more detail the circuit arrangement for removing noise in the image-sensing system of FIG. 10.

Referring to FIG. 11, the detailed internal circuit configuration of the noise-removing circuit 108 is shown. This concrete circuit arrangement was actually designed and produced by the present inventors.

The noise-removing circuit 108 of FIG. 11 is constituted by utilizing what is called a double equilibrium differential circuit. When the double equilibrium differential circuit combined with two sets of differential amplifiers is used to form the aforementioned two amplifiers 110 and 112, switches 114-1 and 114-2, and adder 116, the frequency of the control pulse signals 122 can be improved to accelerate the extraction (noise-extracting process) of the effective signal.

A CCD image sensor 100 is connected to a timing generator 150, and is driven by this generator 150. An image-sensing signal from this CCD image sensor 10 is supplied to a DC reproducer 106 through the amplifier 104. In FIG. 11, the DC reproducer 106 is constituted by a feedback clamp circuit having a differential circuit 152, a sample-hold circuit 154, a hold capacitance Ch, and a DC amplifier 156. The timing generator 150 supplies the sample-hold circuit 154 with a clamp pulse signal 158. The sample-hold circuit 154 holds the level at the predetermined time point of the horizontal blanking period of the input signal to the circuit 108 in the capacitance Ch in synchronization with a clamp pulse signal 158. The signal voltage held by this capacitance Ch is converted into a horizontal period voltage, amplified by the DC amplifier 156, and then is supplied to the input of the differential circuit 152. In this manner, effective DC reproduction can be performed.

The pulse signal 160 having the same period as the read-out clock pulse obtained from the timing generator 150 is supplied to a wave-shaping circuit 162, which converts the waveform of the aforementioned signal to a sinusoidal waveform. The sinusoidal wave signal from the circuit 162 is supplied to a phase-adjusting circuit 164, which adjusts the phase so that the phase of the sinusoidal wave signal severely coincides with that of the aforementioned periods Ta and Tb. The output signal from the circuit 162 is supplied to a control pulse generator 166. Two pulse signals 122-1, 122-2 having phases delayed by 180° from each other are obtained by this generator 166. According to the present invention, the phase of the control pulse signals 122 must be controlled in order to be synchronized with the CCD output signal, but this operation can be readily and reliability performed by varying one bias of the control pulse signals 122.

The noise-removing circuit 108 includes (1) a first differential amplifier unit (or differential pair) DA1 which has transistors Qa, Qb (serving as differential drivers) and Qc (serving as a constant current circuit); and (2) a second differential amplifier unit DA2 which has transistors Qd, Qe (serving as differential drivers) and Qf (serving as a constant current circuit). Such a circuit arrangement itself is well-known as a double equilibrium differential amplifier. In this circuit 108, the bases of the transistors Qa and Qe are commonly connected to each other, while the bases of the transistors Qb and Qd are commonly connected to each other. The collectors of the transistors Qa and Qd are commonly connected to each other, while those of the transistors Qb and Qe are commonly connected to each other. Further, the emitters of the constant current circuit having the transistors Qc and Qf is connected to a constant current circuit 170.

Figure 12:
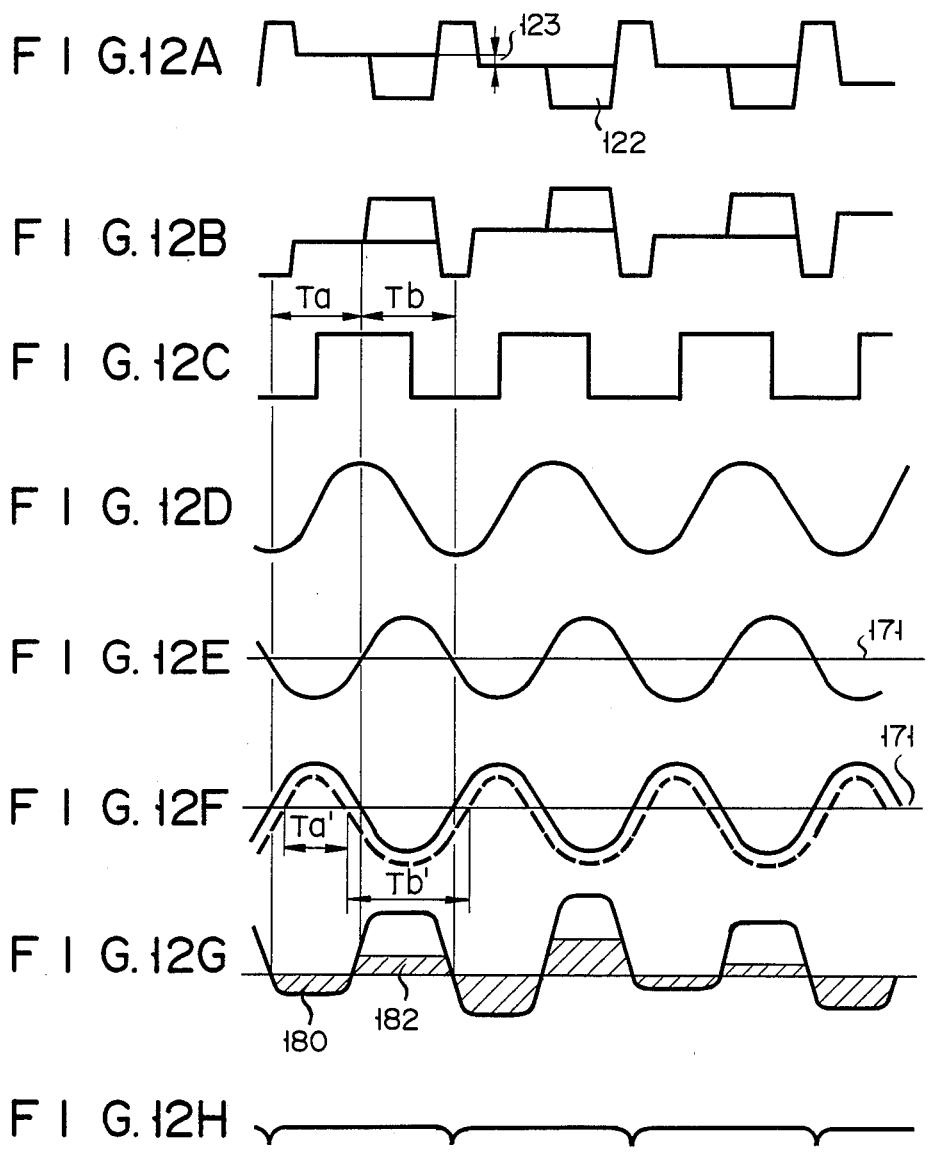
FIGS. 12A to 12H are diagrams showing the waveforms of signals generated in an essential section of the circuit arrangement of FIG. 11.

The operation mode (noise-removing operation) of the circuit arrangement shown in FIG. 11 will now be described in detail hereinafter, with reference to FIG. 12. FIG. 12A again shows the waveform of the CCD output signal. A signal reproduced by DC (whose waveform is shown in FIG. 12B) is supplied to the base of the transistor Qc. At this time, a timing output signal 160 shown in FIG. 12C is produced from the timing generator 150, and a signal waveform-shaped to have a sinusoidal waveform is produced from the circuit 162 as shown in FIG. 12D. A predetermined DC reference voltage Vg is supplied to the base of the transistor Qf. The control pulse signal 122-1 (whose waveform is shown in FIG. 12E, and reference numeral 171 denotes a converting level) is supplied to the bases of the transistors Qa and Qe. The second control pulse signal 122-2 (whose waveform is shown in FIG. 12F) having reverse of phase to the control pulse signal 122-1 is supplied to the bases of the transistors Qb and Qd. As a result, when the positive-going pulses are input to the bases of these transistors, the collector currents of the corresponding differential pair are saturated, while when the negative-going pulses are input to the bases of the transistors of the differential pair, the differential pair is cut off. Thus, the collector currents of the differential pair are flowed in an OFF/OFF repetitive pulse manne at one-half the period of the control pulse signal 122-1. In the meantime, when a DC-reproduced signal is input from the DC reproducer 106 to the base of the transistor Qc, the transistors Qb and Qd become conductive during the period Ta. Therefore, the signal transmission route in this period has the path shown by dotted line 172 in FIG. 11. In other words, the input signal is inverted by the transistor Qc, and further is flowed through the transistor Qb. On the other hand, during the period Tb, the transistors Qb and Qd become nonconductive, and the transistors Qa and Qe become conductive. Thus, the signal transmission path during this period becomes that shown by broken line 174. In other words, the input signal is not inverted, but appears at the emitter of the transistor Qe having the same phase, and is flowed thereafter through the transistor Qe. As a result, an addition result signal 124 of the signal components which are inverted during the period Ta and becomes in phase during the period Tb is obtained and produced at the emitter terminal 176 of the transistor Qe. This addition result signal 124 is supplied to the LPF 118 through the transistor Qh. This addition result signal 124 includes the inverted noise components 180 and the noise components 182 of the same phase during one picture element period as shown in FIG. 12G. This state means that only the noise components contained in the CCD output signal are modulated to have a frequency twice that of the original frequency. Therefore, the noise components thus modulated can be removed by passing the signal 124 through the LPF 118. The waveform of the signal after removing the noise components output from the LPF 118 is shown in FIG. 12H.

In the aforementioned noise component elimination or cancellation, it is important that the noise quantity contained during the two periods Ta and Tb are set to be equal to each other. Thus, the phases of the control pulse signals 122 are finely adjusted. According to the present embodiment, the voltage adjustment (bias adjustment) can be performed as described above without employing difficult time adjustment. Therefore, the removal of the noise can be improved. This method is performed by varying the bias level of the control signal 122-2 to the bias level of the control signal 122-2. As a result, as shown in FIG. 12F, the period Ta is shortened to become Ta', and the period Tb is increased to become Tb'. The ON/OFF periods of the transistors Qb and Qd are respectively controlled by the bias adjustment of the control signal 122-2 to accurately equalize the noise quantity inverted in each one picture element period to that of the same phase. Consequently, noise cancellation can be improved.

According to the aforementioned circuit arrangement for removing or limiting the reset noise contained in the CCD image signal from the CCD 10, which uses the double equilibrium differential circuit of the high speed type, the extracting operation (i.e., the reset noise-removing operation) of the effective image components can be effectively performed. Further, the control pulse signals 122-1 and 122-2 cancel each other in the differential circuit section, and any more noise caused by the pulses can be accordingly reduced to the minimum limit. Further, according to the embodiment, the image signal is processed in the state containing the DC components, and the mixture of noise generated in the conventional noise elimination technique (i.e., the mixture of high frequency noises in th sample-hold process) can be extremely reduced.

In an example actually produced and tried by the present inventors, the CCD 100 which has a CCD chip of 400 (horizontal direction)×500 (vertical direction) (model TCD205C sold by Toshiba Corporation) is employed. Heretofore, the noise mixed with the CCD image-sensing signal cannot be reduced to 2 mV or lower (driven by 7.16 MHz of horizontal clock frequency). At the same time, according to this example, noise can be largely reduced to 0.2 mV of approximately one-tenth the conventional one. This fact means that the conventional television camera having 3,200° K. brightness, F1.4 of lens diaphragming and 10 lux of sensitivity can perform the sensitivity of 1 lux corresponding to the sensitivity of approximately ten times under the same conditions. In other words, merely by adding the circuit arrangement of the present invention, the characteristics range of the CCD can be increased approximately ten times.

Figure 13:
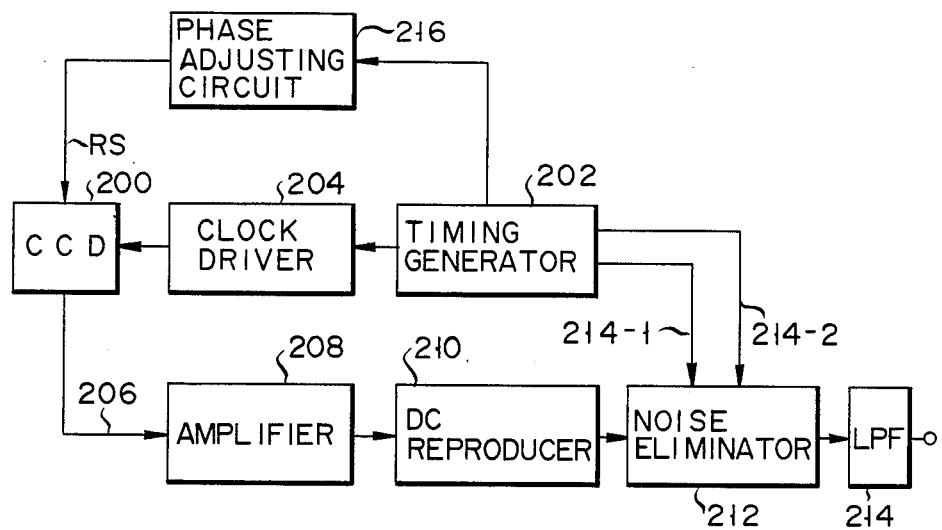
FIG. 13 is a block diagram schematically showing a modified example of the noise-removing circuit arrangement of FIG. 11.

FIG. 13 shows a modified embodiment of the aforementioned second embodiment of the present invention. Noise suppression according to the present invention is important to equally set time length of the aforementioned noise period Ta, and the noise and signal mixture period Tb. The modified embodiment described in the following adjusts the length of the periods by varying the phase of the reset pulse for driving the CCD.

Figure 14A:
FIGS. 14A to 14E are diagrams showing the waveforms of signals generated in an essential section of the circuit arrangement of FIG. 13.

In FIG. 13, a CCD image sensor 200 is driven on the basis of a clock pulse signal generated from a timing generator 202 synchronized with the timing adapted, for example, for an NTSC television system and supplied through a clock driver 204. This clock pulse signal has the waveform shown in FIG. 14A. The CCD output signal 106 from the CCD 200 is transmitted to a noise eliminator 212 through an amplifier 208 and a DC reproducer 210. The output signal from this noise eliminator 212 is supplied to an LPF 214 provided at the rear stage and is subjected to a filtering process.

Figure 14B:
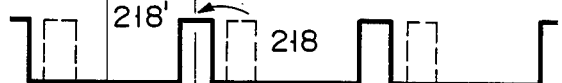
Figure 14C:
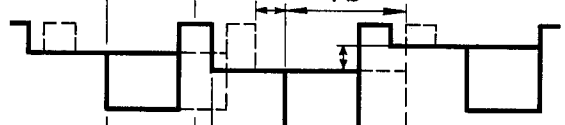
Figure 14D:
Figure 14E:

The noise eliminator 212 is supplied from the timing generator 202 with control pulse signals 214-1, 214-2. The noise eliminator 212 removes (extracts) the noise period Ta, and the noise and signal mixture period Tb of the CCD output signal in response to these signals 214-1, 214-2, and inverts the phase of either one of the control pulse signals. (As a result, the control pulse signals 214-1, 214-2 have phases that are the reverse of each other as shown in FIGS. 14D and 14E.) In order to maximize the noise-removing effect, it is important that the noise quantities contained in the periods Ta and Tb be equally set to each other. According to the modified embodiment, the phase of the reset pulse signal RS applied to the CCD 200 is changed to be equal to the noise quantities contained in the noise period Ta, and to the noise and signal mixture period Tb. The position of the pulse components 218 of the reset pulse signal RS is shifted to "218'" in FIG. 14B by the phase-adjusting circuit 216 so that the phase of the reset pulse signal RS coincides with that of the clock pulse signal of FIG. 14A. As a result, the phase of the CCD output signal thus obtained can be shifted in response to the phase of the reset pulse RS as shown in FIG. 14C. The noise period, and the noise and signal mixture period respectively become "Ta'" and "Tb'" when the reset pulse components are located at the position designated by broken line 218 of FIG. 14B, and when the noise quantities contained in both periods are largely different. Thus, even if the waveform is inverted during one period and the noise components cancel each other, the final noise cancellation effect is low. On the other hand, the final noise cancellation effect can be improved or enhanced by equalizing the noise quantities contained in both periods Ta and Tb by shifting the phase of the reset pulse RS to the positions shown by solid line in FIG. 14B. Incidentally, in the modified embodiment, since the rise of the clock pulse is contained during the ON period of the reset pulse, the adverse influence of the mixture or jump of the clock pulse to the output signal can be improved. Consequently, the signal-to-noise ratio can be further improved and high sensitivity can be provided in the television camera.

Figure 15:
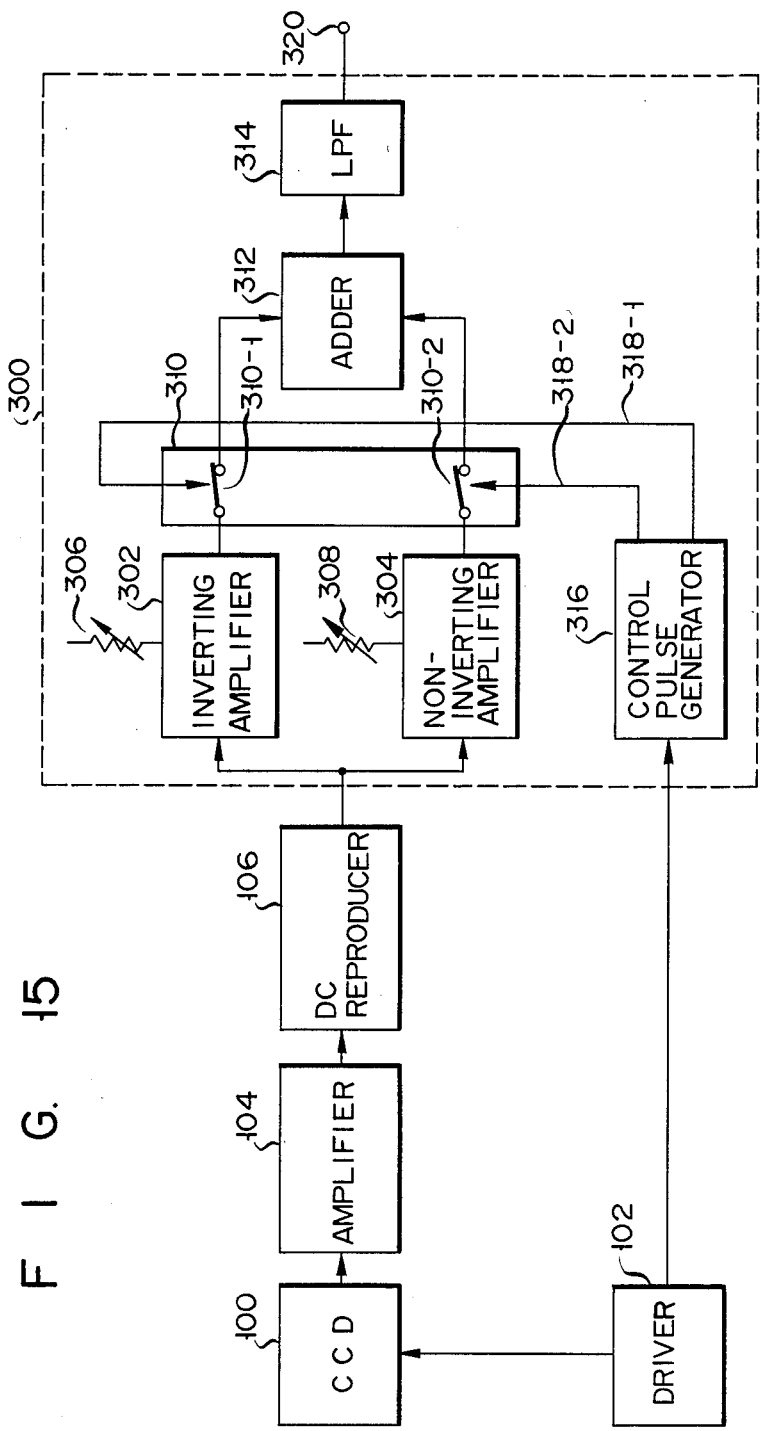
FIG. 15 is a block diagram showing the overall configuration of an image-sensing system according to a third embodiment of the present invention.

FIG. 15 shows an image sensing system according to a third embodiment of the present invention. The same reference numerals in FIG. 15 denote the same or equivalent portions as in the second embodiment described above, and a detailed description thereof is omitted.

Noise-removing circuit 300 shown in FIG. 15 includes inverting amplifier 302 connected to DC reproducer 106, and non-inverting amplifier 304. Amplifiers 302 and 304 are connected in parallel with each other. The gain of amplifier 302 can be changed by adjusting gain controller 306 including a variable resistor. Similarly, the gain of amplifier 304 can be changed by adjusting gain controller 308.

Switching circuit 310 having two switches 310-1 and 310-2 is provided at the rear stage of amplifiers 302 and 304. The outputs of amplifiers 302 and 304 are thus connected to first and second inputs, respectively, of adder circuit 312 through switches 310-1 and 310-2. Adder 312 adds the output signals from amplifiers 302 and 304 to generate a sum signal. The sum signal is supplied to an averaging circuit comprising, e.g., low-pass filter (LPF) 314.

Control pulse generator 316 provided in circuit 300 generates first and second control pulse signals 318-1 and 318-2 synchronized with a clock pulse signal from CCD driver 102. Signals 318-2 and 318-2 are respectively supplied to switches 310-1 and 310-2 in order to control switching operation of switches 310-1 and 310-2. More specifically, switches 310-1 and 310-2 are switched to be alternately rendered conductive in response to signals 318-1 and 318-2, respectively.

Figure 16:
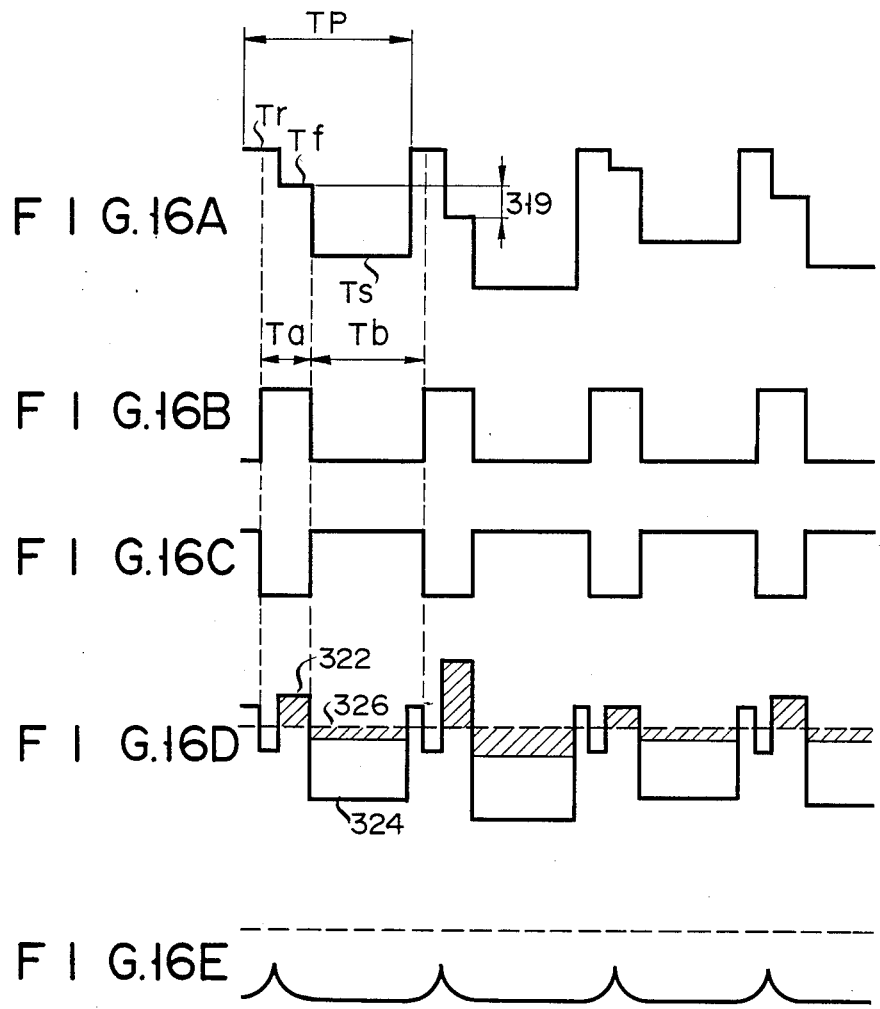
FIGS. 16A to 16E are diagrams showing the waveforms of signals generated in main components of the image-sensing system of FIG. 15.

A CCD output signal is controlled by driver 102 to have three periods, i.e., reset period Tr, noise period Tf, and signal period Ts, in one picture element period TP. Reset period Tr is a period during which a reset pulse signal is mixed, and is represented by "T3" in FIG. 8A. Noise period Tf is also called a feed through period, and corresponds to period "T1" in FIG. 8A. Signal period Ts is a period including an image signal component and a noise component, and corresponds to period "T2" in FIG. 8A. Note that reference numeral 319 in FIG. 16A denotes a noise component. Also note that in period TP, signal period Ts is set to be longer than noise period Tf in order to further improve the signal-to-noise ratio. Periods Ts and Tf can be set in this manner by adjusting the pulse widths of signals 318-1 and 318-2, which control the ON/OFF period of switches 310-1 and 310-2 as shown in FIGS. 16B and 16C.

According to the third embodiment of the present invention, the ratio of the duration of period Ts to that of period Tf is set to be 3:1. Accordingly, when the number of horizontal picture elements is 380, the duration of period Ts is 90 nanoseconds and that of period Tf is 30 nanoseconds. In this case, as shown in FIG. 16B, first switch 310-1 is switched to be conductive during period Ta including period Tf, and nonconductive during period Tb including period Ts. On the other hand, as shown in FIG. 16C, second switch 310-2 is switched to be nonconductive during period Ta and conductive during period Tb.

Regarding the difference between the durations of periods Ts and Tf described above, the gains of amplifiers 302 and 304 are set in a specific manner as follows. The amplification factor of the CCD output signal during period Tf having a shorter duration than period Ts is set to be higher than that of the CCD output signal during period Ts, so that the noise integration value during period Tf is equal to the integration value of the noise included in the signal during period Ts. Therefore, the gain of amplifier 302 is adjusted appropriately to be higher than that of amplifier 304 to obtain equal integration values. More specifically, assuming that the gains of amplifiers 302 and 304 are respectively −A1 and A2, the respective gains are determined to satisfy the following equation (1):

$$tf \cdot A1 = ts \cdot A2 \tag{1}$$

where
tf: duration of period Tf
ts: duration of period Ts
In this case, noise integration value In during period durations tf and ts can be expressed as follows:

$$In = tf \cdot A1/R = ts \cdot A2/R \tag{2}$$

where R is the integration resistance.

Using noise-removing circuit 300 having the above arrangement, 1/f noise included in the CCD output signal from CCD image sensor 100 can be eliminated further effectively in the following manner. During an image sensing operation, the CCD output signal from sensor 100 is supplied to circuit 300 through amplifiers 104 and 106. In this case, the CCD output signal is simultaneously supplied to inverting and non-inverting amplifiers 302 and 304 having different gains. Amplifier 302 inverts and amplifies the signal at gain −A1 set in the above manner. Amplifier 304 amplifies the signal at gain A2 without inversion. During period Ta in one pixel period or one picture element period TP, first and second switches 310-1 and 310-2 are conductive and nonconductive, respectively, in response to control pulse signals 318-1 and 318-2. Therefore, the output signal (i.e. the inverted CCD output signal) from amplifier 302 is supplied to adder 312 through switch 310-1 only during period Ta. In this case, the output signal (i.e., the non-inverted CCD output signal) from amplifier 304 is prohibited from being supplied to adder 312 by nonconductive switch 310-2. Therefore, the sum output of adder 312 during period Ta has waveform 322 shown in FIG. 16D. Waveform 322 indicates a noise component inverted at gain −A1.

During the following period Tb in one picture element period TP, first and second switches 310-1 and 310-2 are nonconductive and conductive, respectively. Therefore, the output signal from amplifier 304 is supplied to adder 312 through switch 310-2 only during period Tb. In this case, the inverted CCD output signal of amplifier 302 is prohibited from being supplied to adder 312. As a result, the sum output from adder 312 during period Tb has waveform 324 in FIG. 16D. Waveform 324 represents a signal amplified in the same phase at gain A2. The noise component included in the CCD output signal during period Tb can be obtained in the same phase, as indicated by waveform 326 in FIG. 16D. When the CCD output signal having the waveform as shown in FIG. 16D during period TP is averaged by LPF 314, inverted noise component 322 during period Ta and noninverted noise component 326 during period Tb are cancelled with each other, thereby providing a CCD image-sensing signal of good quality (shown in FIG. 16E) at output 320 of circuit 300. Therefore, according to the third embodiment, when period Ts during period TP is increased, the basic signal-to-noise ration of the image signal can be improved. In addition, the noise components included in the image signal can be eliminated by noise cancellation, so that the sensitivity of the CCD image sensor can be greatly improved.

Figure 17:
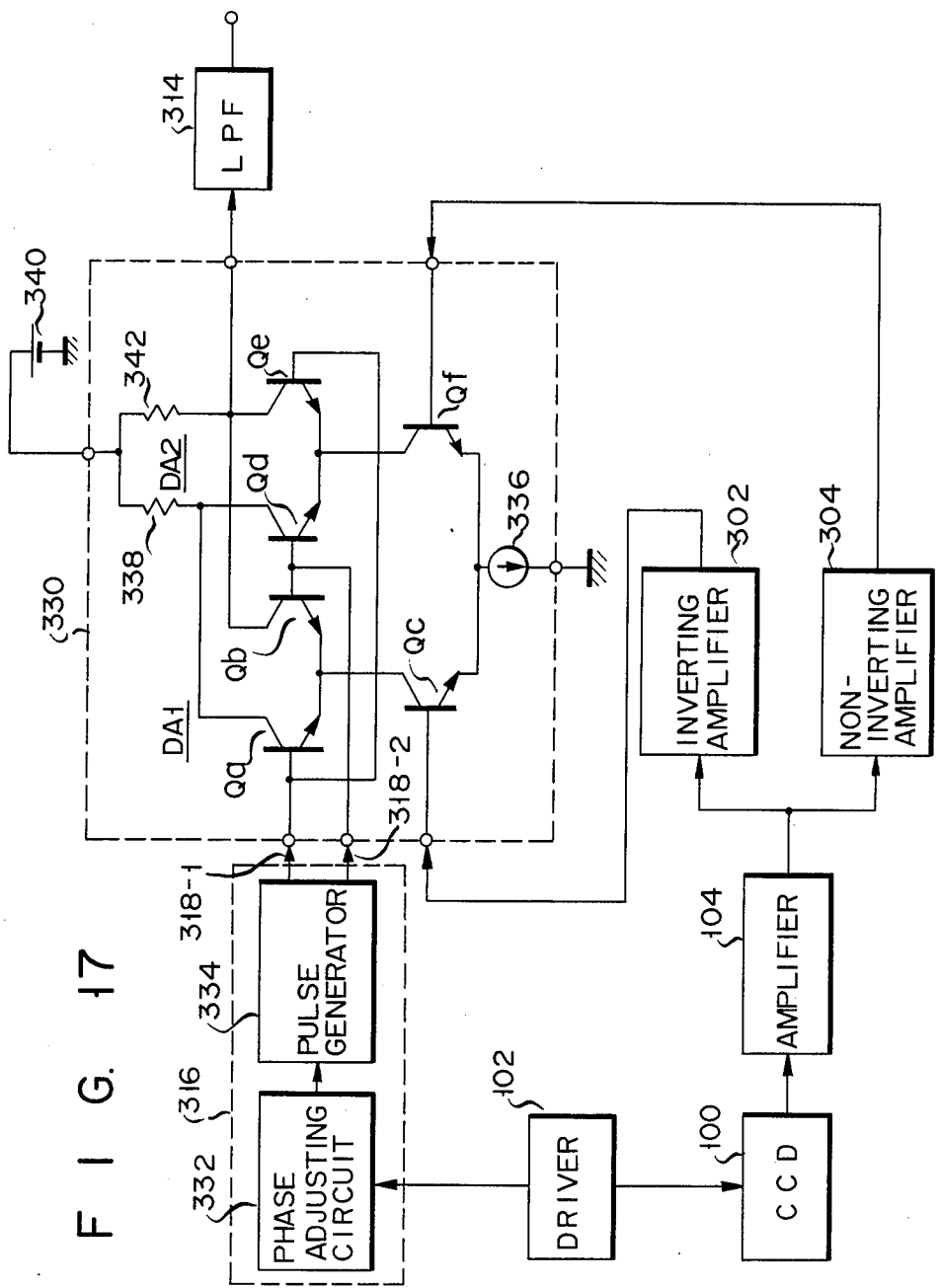
FIG. 17 is a circuit diagram illustrating in more detail the circuit arrangement for removing noise in the image-sensing system shown in FIG. 15.

FIG. 17 shows the circuit arrangement of circuit 300 in more detail. The exemplary circuit configuration is a circuit experimentally fabricated by the present inventors as a circuit preferable for performing the above-described noise-eliminating operation. In this circuit configuration, double equilibrium differential circuit 330 combined with two sets of differential amplifiers DA1 and DA2 is used in order to constitute switching circuit 310 and adder 312. By using circuit 330 having this arrangement, the gate frequency can be increased to perform a high-speed, image-sensing operation, and the pulses mixed with the image sensing signal can be minimized.

Control pulse generator 316 includes phase-adjusting circuit 332 connected to CCD driver 102, and pulse generator 334. Circuit 332 adjusts the phase of a signal from driver 102 so as to correspond it precisely to periods Ta and Tb. Generator 334 produces pulse signals, synchronized with periods Ta and Tb, which are 180° out of phase with each other, as control pulse signals 318-1 and 318-2. Signals 318-1 and 318-2 are then respectively supplied to first and second amplifiers DA1 and DA2 of circuit 330 at the next stage.

First amplifier DA1 has two transistors Qa and Qb serving as differential drivers, and transistor Qc serving as a constant current circuit. Similarly, second amplifier DA2 has two transistors Qd and Qe serving as differential drivers, and transistor Qf serving as a constant current circuit. The bases of transistors Qa and Qe are commonly connected, and the emitters of transistors Qc and Qf are connected to constant current supply 336. The collectors of transistors Qa and Qd are connected to DC bias voltage generator 340 (including, e.g., a DC battery) through resistor 338. The collectors of transistors Qb and Qe (which correspond to outputs of circuit 310) are connected to LPF 34 and to DC bias voltage generator 340 through resistor 342. The outputs of amplifiers 302 and 304 are respectively connected to the bases of transistors Qc and Qf.

In the third embodiment, since a double equilibrium differential circuit is used as a noise eliminator, a high-speed operation can be obtained. In addition, since two control pulses 318-1 and 318-2 are cancelled by the differential amplifiers, new noise components are not likely to be added to the signal. Furthermore, since an image signal can be processed as it includes a DC component, foldover noise of high-frequency components in a low-frequency range caused by a sample-hold circuit, which frequently occurs in a conventional noise eliminator, does not occur.

The third embodiment of the present invention was practically fabricated using a CCD image-sensing element (TCD 205C) available from KABUSHIKI KAISHA TOSHIBA. The experimental result for this will now be described. The CCD element had 400 horizontal picture elements and 500 vertical picture elements. The horizontal clock frequency was 7.16 MHz. The noise occurring in this CCD element was 100 equivalent electrons. Therefore, the CCD output signal voltage had to be 300 mV in order to obtain an signal-to-noise of 46 dB. When the noise eliminator according to this embodiment was used, the noise was greatly eliminated to 1/14 (7 equivalent electrons) of the conventional value. This means that a CCD TV camera, which conventionally has a sensitivity of 20 Lx with an aperture of F 1.4 at a radiation of 3200° K., could have an increased sensitivity of 1.4 Lx. Therefore, the range of application of CCD image-sensing element is greatly widened.

Figure 18:
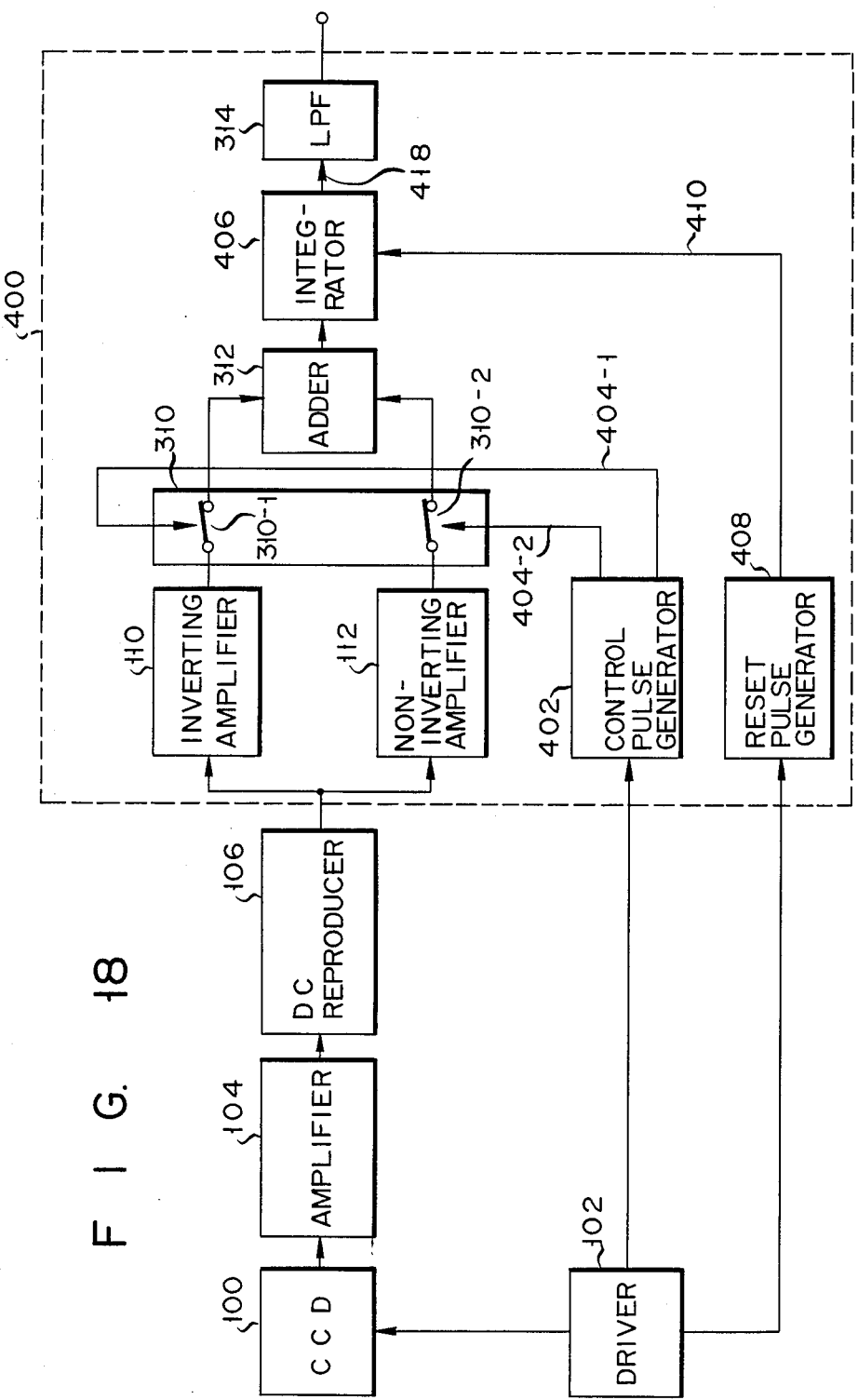
FIG. 18 is a block diagram showing the overall configuration of an image-sensing system according to a fourth embodiment of the present invention.

FIG. 18 shows an image sensing system according to a fourth embodiment of the present invention. In the system of FIG. 18, an integrator is added to a noise-removing circuit according to the second embodiment, described with reference to FIG. 7. Thus, noise period Tf and signal period Ts in one picture element period TP are set to have the same durations. Note that the same reference numerals in FIG. 18 as in the second and third embodiments earlier described denote the same or equivalent portions, and a detailed description thereof is omitted.

Noise-removing circuit 400 in FIG. 18 has inverting and non-inverting amplifiers 110 and 112 having the same gains. This arrangement of circuit 400 is substantially the same as that of the second embodiment shown in FIG. 7. Outputs of amplifiers 110 and 112 connected in parallel with each other are connected to adder 312 through first and second switches 310-1 and 310-2 respectively, of switching circuit 310. Control pulse generator 402 supplies control pulse signals 404-1 and 404-2, having the same ON/OFF durations and being 180° out of phase with each other, to switches 310-1 and 310-2.

Integrator 406 is connected between adder 312 and LPF 314 constituting an averaging circuit. Integrator 406 serves to integrate an added CCD output signal output from adder 312 during period TP. Reset pulse generator 408 generates reset pulse signal 410 in response to a clock signal from driver 102. Integrator 406 is reset at the same cycle as period TP by signal 410.

Figure 19:
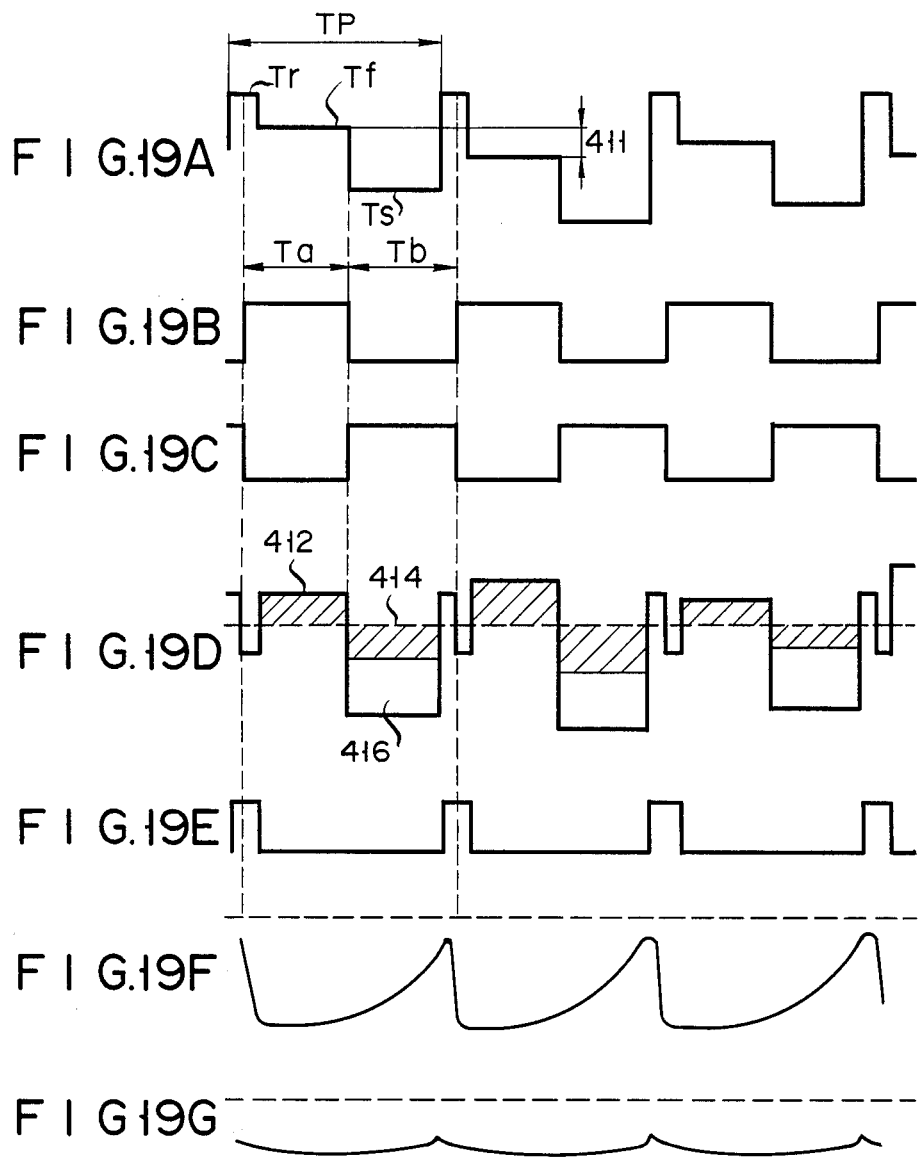
FIGS. 19A to 19G are diagrams showing the waveforms of signals generated in main components of the image-sensing system of FIG. 18.

A CCD output signal generated by CCD image sensor 100 and processed by amplifier 104 and reproducer 106 has a waveform as shown in FIG. 19A (reference numeral 411 in FIG. 19A denotes a noise component). First period Ta including noise period Tf and second period Tb including signal period Ts have the same durations as shown in FIG. 19A. The CCD output signal is inverted and amplified by amplifier 110 during first period Ta, and is amplified in the same phase by amplifier 112 during second period Tb, at the same gain. As a result, during period TP, the sum output signal from adder 312 connected to amplifiers 110 and 112 through switching circuit 310 has inverted and amplified noise component 412 during period Ta, and non-inverted and amplified noise component 414 during period Tb, which is included in CCD output signal 416, as shown in FIG. 19D. This signal processing technique is substantially the same as that of the second embodiment described in FIG. 7.

As shown in FIG. 19E, reset pulse signal 410 supplied to integrator 406 provided at a rear stage of adder 312 has a pulse component synchronized with reset period Tr of period TP. Therefore, integrator 406 is reset in precise synchronization with period Tr, integrates an output signal from adder 312 during first and second periods Ta and Tb in period TP, and generates integration output signal 418 having a waveform shown in FIG. 19F. Signal 418 is averaged by LPF 314 to provide an output signal having a waveform shown in FIG. 19G.

Figure 20:
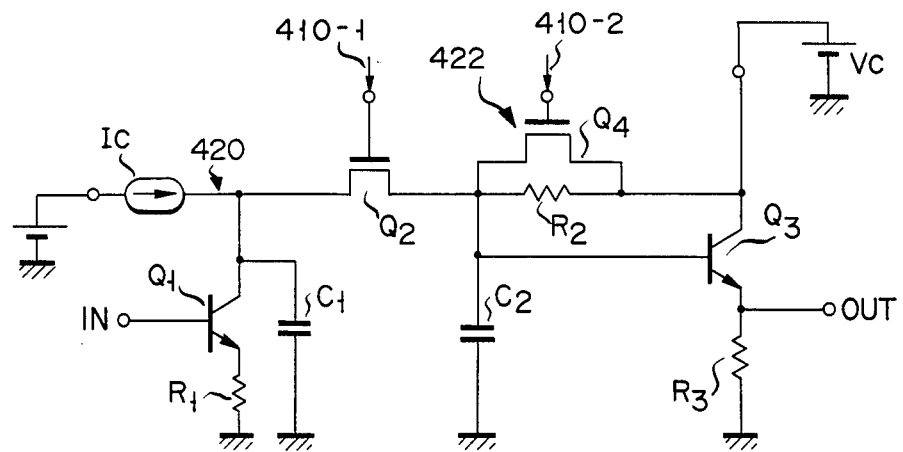
FIG. 20 is a circuit diagram illustrating in more detail an integrator provided in the noise-removing circuit of the image-sensing system shown in FIG. 18.

FIG. 20 shows a circuit configuration of integrator 416 in more detail. Integrator 416 includes two integrating circuits 420 and 422. Circuit 420 at the first stage consists of transistor Q1, constant current circuit Ic, resistor R1, and integration capacitor C1. The base of transistor Q1 serves as an output terminal of integrator 406. Circuit Ic is connected to integrating circuit 422 at the second stage through MOS FET Q2. Circuit 422 consists of resistor R2, integration capacitor C2, and transistor Q3 and resistor R3 constituting an output stage emitter-follower. The collector of transistor Q3 is connected to DC bias power source Vc. The emitter of transistor Q3 serves as an output of integrator 406. MOS FET Q4 is connected in parallel with resistor R2. Reset pulse signals 410-1 and 410-2 are respectively supplied to the gates of MOS FETs Q2 and Q4.

In first-stage integrating circuit 420, charges corresponding to the difference between the current from circuit Ic and that flowing in resistor R1, which depend on the input signal, are charged in capacitor C1. The difference current is integrated while MOS FET Q2 is nonconductive in response to reset pulse 410-1. During this integration period, as shown in FIG. 19C, noise components 412 and 414 having opposite phases cancel each other, thereby eliminating the noise components from the CCD output signal. When MOS FET Q2 is conductive, the charges stored in capacitor C1 corresponding to an effective image signal component are discharged through resistor R2. In this case, if the time constant of resistor R2 and capacitor C2 is set to be shorter than period TP and longer than the width of a reset pulse, the period of the effective signal component of the CCD output signal can be widened. As a result, the signal-to-noise ratio of the image-sensing signal can be increased.

It should be noted that, in the above circuit configuration, second MOS FET Q4 provided in parallel with resistor R2 is controlled by reset pulse signal 410-2 so as to be turned ON/OFF immediately before the ON/OFF operation of first MOS FET Q2. As a result, the CCD output signal output from integrator 406 can be improved to have a signal component substantially lasting the entire duration of period TP.

According to the fourth embodiment of the present invention, noise-removing circuit 400 uses a double equilibrium differential circuit and a circuit for performing integration twice. Thus, noise can be reliably eliminated at a high speed and the signal period can be effectively elongated, so that foldover noise of high-frequency components, which frequently occurs in a conventional noise eliminator, or noise which is caused by mixing in of a control pulse, will not occur. Therefore, the noise occurring in the CCD output section which is included in a CCD output signal is eliminated to a level of several electrons, i.e., less than 1/10 that in a conventional noise eliminator. This fact is confirmed through experiments by the present inventors. This means that the sensitivity of a television camera device using a CCD is improved to about 10 times over that using a conventional noise eliminator. The range of practical application of CCDs is thus greatly widened.

Although the present invention has been shown and described with reference to particular embodiments, various changes and modifications which are obvious to a person skilled in the art to which the invention pertains are deemed to lie within the spirit and scope of the invention.

The solid-state image sensor applied in the present invention is not limited to the CCD, but a CPD which has a MOS structure of photoelectric picture elements and a CCD structure of horizontal read-out section may be employed. The common points to these solid-state image sensors include the fact that the signal charge detectors are reset by the ON/OFF of reset transistors periodically.

In the description of the embodiments, the CCD having floating diffusion type detectors forming P-N diodes in the substrate has been shown and described. However, a CCD having floating gate detectors utilizing MOS diodes may also be employed in the present invention.

What is claimed is:

1. An image-sensing apparatus comprising:
 (a) image sensor means for receiving an incident image light to generate an electrical CCD output signal, said image sensor means including a solid-stage image sensor which has,
 a substrate,
 a photosensing picture element section formed on said substrate, for photoelectrically converting the image light to produce one set of signal carriers,
 a carrier detecting section formed on said substrate so as to be electrically floating, said carrier detecting section receiving the signal carriers transmitted thereinto,
 sense amplifier circuit means for detecting the variation in a voltage due to the transfer of said carriers into said carrier detecting section, thereby outputting a detection signal, and
 resetting means formed on said substrate, for resetting the potential of said carrier detecting section to a predetermined potential at every read-out period of said photosensing picture element section; and
 (b) noise-eliminating means connected to said image sensor device, for dividing one picture element period of the CCD output signal into a first period during which the CCD output signal consists of a noise component generated in said image sensor itself and a second period during which the CCD output signal consists of a mixture of a noise componet and an effective image signal component and which is longer than the first period, for amplifying the CCD output signal at first and second amplification gains which are determined to be different from each other during the first and second periods in such a manner that the first gain is large enough to make an integration value of the noise component appearing in the first period substantially equal to that in the second period, for inverting the differently amplified CCD output signal only during one of the first and second periods, and for adding signal waveforms of said CCD output signal to which are generated during the first and second periods to each other, to whereby cancel out the noise components appearing in the first and second periods.

2. The apparatus according to claim 1, wherein said noise-eliminating means comprises:
 inverting amplifier means, provided to receive the CCD output signal, for inverting and amplifying the CCD output signal at the first amplification gain only during either one of said first and second periods; and
 non-inverting amplifier means, provided in parallel with said inverting amplifier means to receive the CCD output signal, for amplifying the CCD output signal at the second amplification gain in the same phase during the other of said first and second periods.

3. The apparatus according to claim 2, wherein said noise-eliminating means further comprises:
 switching circuit means, connected to said inverting amplifier means and said non-inverting amplifier means, for receiving first and second control signals which define the first and second periods and for performing a switching operation, in response to the control signals, to thereby alternately generate output signals from said inverting amplifier means and said non-inverting amplifier means during the first and second periods, respectively.

4. The apparatus according to claim 3, wherein said noise-eliminating means further comprises:
 adder means connected to said switching circuit means, for combining the output signals of said inverting amplifier means and said non-inverting amplifier means alternately output in synchronization with the first and second periods from said switching circuit means, thereby cancelling out an inverted noise component contained in a signal component inverted by said inverting amplifier means by a noise component of the same phase contained in the output signal of said non-inverting amplifier means.

5. The apparatus according to claim 3, wherein said noise-eliminating means further comprises:
 integrator means connected to said switching circuit means, for integrating the output signals of said inverting amplifier means and said non-inverting amplifier means alternately output in synchronization with the first and second periods from said switching circuit means, thereby cancelling out an inverted noise component contained in a signal component inverted by said inverting amplifier means by a noise component of the same phase contained in the output signal of said non-inverting amplifier means.

6. The apparatus according to claim 5, wherein said integrator means comprises:
 first integration circuit means connected to said switching circuit means, including a capacitor for accumulating charges corresponding to an effective signal component of the output signals form which the noise components are removed; and
 second integration circuit means connected to said first integration circuit means, for discharging the charges in said first integration circuit means as an output signal of said integrator means.

7. The apparatus according to claim 4, wherein said inverting amplifier means, said non-inverting amplifier means, said switching circuit means are constituted of a double equilibrium differential transistor circuit.

* * * * *